US008519803B2

(12) United States Patent
McLaren et al.

(10) Patent No.: US 8,519,803 B2
(45) Date of Patent: Aug. 27, 2013

(54) RESONATOR SYSTEMS AND METHODS FOR TUNING RESONATOR SYSTEMS

(75) Inventors: Moray McLaren, Bristol (GB); Raymond G. Beausoleil, Redmond, WA (US); Marco Fiorentino, Mountain View, CA (US); Nathan Lorenzo Binkert, Redwood City, CA (US); Norman Paul Jouppi, Palo Alto, CA (US); Alan Lynn Davis, Coalville, UT (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 426 days.

(21) Appl. No.: 12/915,598

(22) Filed: Oct. 29, 2010

(65) Prior Publication Data
US 2012/0105177 A1 May 3, 2012

(51) Int. Cl.
*H04B 10/02* (2006.01)
*G02B 6/12* (2006.01)
*G02B 6/26* (2006.01)
*H04J 14/02* (2006.01)

(52) U.S. Cl.
USPC ............. 333/17.1; 333/219; 385/14; 385/30; 385/50; 398/68; 398/69; 398/82; 398/141; 398/200; 398/214; 359/332

(58) Field of Classification Search
USPC ................. 333/17.1, 219, 219.1; 385/14, 15, 385/30, 39–42, 50, 51; 398/68, 69, 79, 82, 398/85, 141, 200, 214; 359/332
See application file for complete search history.

(56) References Cited

U.S. PATENT DOCUMENTS

| 6,636,668 | B1 * | 10/2003 | Al-hemyari et al. | 385/40 |
|---|---|---|---|---|
| 7,085,499 | B2 * | 8/2006 | Yap et al. | 398/183 |
| 7,231,113 | B2 * | 6/2007 | Chu et al. | 385/30 |
| 7,460,746 | B2 * | 12/2008 | Maleki et al. | 385/27 |
| 7,729,576 | B2 * | 6/2010 | Kornilovich et al. | 385/32 |
| 7,889,956 | B2 * | 2/2011 | Beausoleil et al. | 385/14 |
| 2005/0013537 | A1 * | 1/2005 | Yamazaki | 385/27 |
| 2006/0198415 | A1 * | 9/2006 | Yamazaki | 372/94 |
| 2008/0112667 | A1 * | 5/2008 | Hamann et al. | 385/24 |
| 2009/0245296 | A1 * | 10/2009 | Santori et al. | 372/20 |
| 2010/0200733 | A1 * | 8/2010 | McLaren et al. | 250/214 C |
| 2012/0057866 | A1 * | 3/2012 | McLaren et al. | 398/25 |
| 2012/0062974 | A1 * | 3/2012 | Manipatruni et al. | 359/238 |

FOREIGN PATENT DOCUMENTS
WO    WO 2010/108093 A2 *   9/2010

OTHER PUBLICATIONS

R. Amatya et al.; "Precision Tunable Silicon Compatible Microring Filters"; IEEE Photonics Technology Letters, vol. 20, No. 20, Oct. 15, 2008, pp. 1739-1741.*

M.H. Khan et al.; "Eight-Channel Microring Resonator Array with Accurately Controlled Channel Spacing"; Lasers and Electro-Optics 2008 Conference on Quantum Electronics and Laser Science, May 4-9, 2008, two page article and one IEEE abstract page.*

* cited by examiner

*Primary Examiner* — Barbara Summons

(57) ABSTRACT

Tunable resonator systems and methods for tuning resonator systems are disclosed. In one aspect, a resonator system includes an array of resonators disposed adjacent to a waveguide, at least one temperature sensor located adjacent to the array of resonators, and a resonator control electronically connected to the at least one temperature sensor. Each resonator has a resonance frequency in a resonator frequency comb and channels with frequencies in a channel frequency comb are transmitted in the waveguide. Resonance frequencies in the resonator frequency comb are to be adjusted in response to ambient temperature changes detected by the at least one temperature sensors to align the resonance frequency comb with the channel frequency comb.

19 Claims, 23 Drawing Sheets

RESONATOR SYSTEMS AND METHODS FOR TUNING RESONATOR SYSTEMS

TECHNICAL FIELD

This disclosure relates to optical communication and photonic interconnects.

BACKGROUND

In recent years, microring resonators ("resonators") have increasingly been employed as an essential component in optical networks and other nanophotonic systems that are integrated with electronic devices. A resonator can ideally be configured with a resonance frequency (or wavelength) substantially matching a particular frequency of light. When the resonator is positioned adjacent to a waveguide within the evanescent field of light propagating along the waveguide, the resonator evanescently couples the light from the waveguide.

A resonator's dimensions directly affect the resonator's resonance frequency, which is particularly important because in typical WDM systems the frequencies may be separated by fractions of a nanometer. However, even with today's microscale fabrication technology, fabricating resonators with the dimensional precision needed to ensure that the resonator's resonance frequency matches a particular frequency of light can be difficult. This problem arises because a resonance frequency of a resonator is inversely related to the resonator's size.

In addition to inaccuracies encountered during fabrication of resonators, environmental conditions can change the resonance frequency of a resonator. For example, a temperature change in the resonator shifts the effective refractive index and may change the size of the resonator resulting in deviations from a desired resonance frequency. This is problematic in integrated CMOS-nanophotonic systems where the power dissipation and temperature of adjacent circuitry can vary considerably over time.

Engineers and physicists continue to seek systems and methods for tuning resonators to compensate for resonance frequency deviations due to fluctuations in environmental conditions and fabrication inaccuracies.

DETAILED DESCRIPTION

This disclosure is directed to tunable resonator systems that can be used in optical communications as modulators to encode optical signals in numerous channels of electromagnetic radiation, detectors that convert optical signals into electronic signals from processing, and drop/add filters to selectively place certain of numerous optical signals onto waveguides. The resonator systems can be electronically and/or thermally tuned to account for surrounding temperature fluctuations.

In the following description, the term "light" refers to electromagnetic radiation with frequencies in the visible and non-visible portions of the electromagnetic spectrum. The term "optical" relates to electromagnetic radiation in the visible and non-visible portions of the electromagnetic spectrum. The term "channel" refers to a frequency of electromagnetic radiation or a narrow band of frequencies centered about a particular frequency. For example, an optical signal can be composed of high amplitude portions of a channel that each represent logic bit value "1" and low amplitude portions of the same channel that each represent logic bit value "0," or vice versa.

The detailed description of this disclosure is organized into three subsections: A brief general description of tunable resonators is provided in a first subsection. Examples of various tunable resonator systems are provided in a second subsection. Examples of operating tunable resonator systems to maintain resonance with a number of channels is provided in a third subsection.

Tunable Resonators

Figure 1:
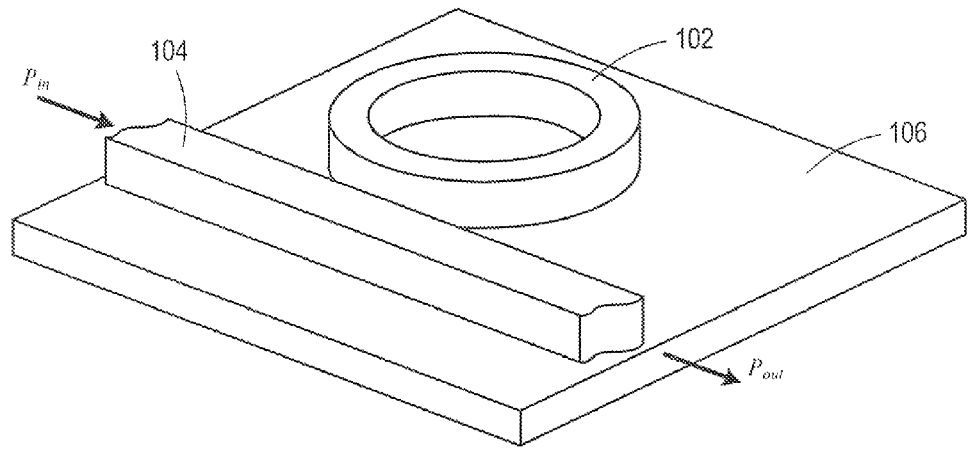
FIG. 1 shows an isometric view and enlargement of an example microring resonator and an adjacent ridge waveguide disposed on a substrate.

FIG. 1 shows an isometric view and enlargement of an example microring resonator ("resonator") 102 and a portion of an adjacent ridge waveguide 104 disposed on the surface of a substrate 106. The resonator 102 and waveguide 104 are typically composed of a material having a relatively higher refractive index than the substrate 106. For example, resonators and waveguides can be composed of silicon ("Si") and the substrate can be composed of $SiO_2$ or another suitable lower refractive index material. The resonators and waveguides can have an air cladding or can be covered by a lower refractive index material that serves as a cladding layer. The resonators and waveguides can be formed by first depositing a high refractive index material on a lower refractive index material that serves as the substrate. The resonators and waveguides can be formed in the higher refractive index material using various lithographic and/or etching techniques. For example, the resonators and waveguides can be formed using nanoimprint lithography or reactive ion etching.

A channel transmitted along the waveguide 104 is evanescently coupled from the waveguide 104 into the resonator 102 when the channel and the dimensions of the resonator 102 satisfy the resonance condition:

$$f_m = \frac{mc}{np}$$

where n is the effective refractive index of the resonator 102, p is the effective perimeter of the resonator 102, m is a positive integer indicating the order of the resonance and is referred to as the axial mode or simply "mode" of the resonator 102, and c is the free space speed of light. When the frequency f of light carried by the waveguide 104 equals the resonance frequency $f_m$ of the microring 102 for some mode m, the microring 102 resonates at this frequency and the light is evanescently coupled from the waveguide 104 into the resonator 102. Evanescent coupling is the process by which evanescent waves of light are transmitted from one medium, such as a resonator, to another medium, such a ridge waveguide, and vice versa. In other words, evanescent coupling between the resonator 102 and the waveguide 104 can occur when light with frequency f equals the resonance frequency $f_m$ of the resonator 102. The evanescent field gives rise to light with frequency f that propagates in the resonator 102, and the light is evanescently coupled from the waveguide 104 into the resonator 102. Frequencies of light satisfying the resonance condition above are said to have "resonance" with the resonator 102 and are evanescently coupled from the waveguide 104 into the resonator 102.

In general, the frequency f and physical wavelength $\tilde{\lambda}=\lambda/n$ of light propagating through a material with n satisfy the relation $\lambda f=c/n$. As a result, the resonance condition can also be expressed in terms of physical wavelength as $\tilde{\lambda}_m=p/m$. In other words, a resonance is achieved whenever an integer number m of physical wavelengths fits around the resonator perimeter.

Figure 2:
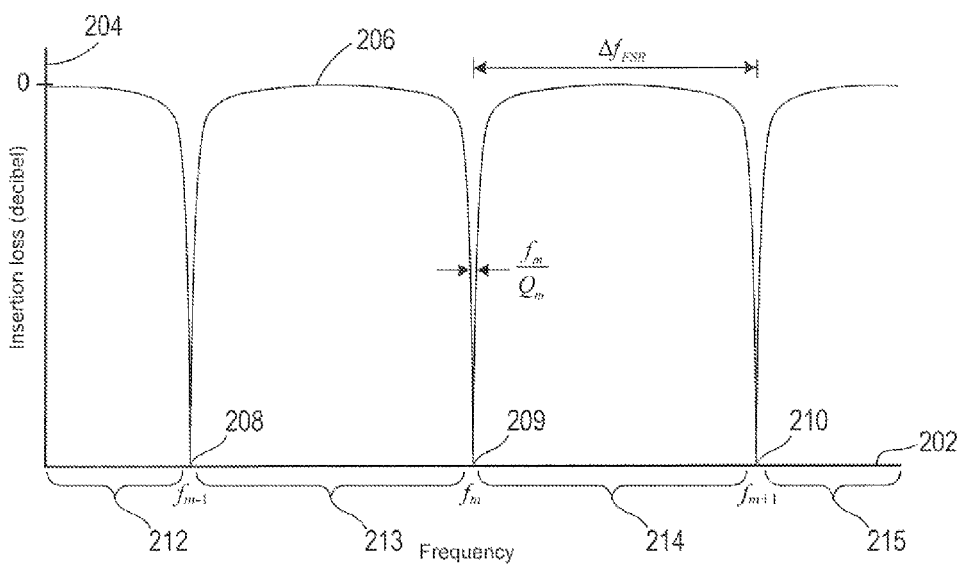
FIG. 2 shows an example plot of insertion loss versus frequency for a microring resonator.

The resonance condition indicates that a resonator has a spectrum of resonance frequencies, each frequency in the spectrum corresponding to a particular mode m. The resonance frequencies supported by the resonator 102 can be represented by an insertion loss versus frequency plot. FIG. 2 shows an example plot of insertion loss versus frequency for the resonator 102 and the waveguide 104 shown in FIG. 1. Insertion loss, also called attenuation, is the loss in optical power of a frequency of light traveling in the waveguide 104 due to evanescent coupling of the light into the resonator 102. Insertion loss can be expressed as $10 \log_{10}(P_{in}/P_{out})$ in decibels ("dB"), where, as shown in FIG. 1, $P_{in}$ represents the optical power of light traveling in the waveguide 104 prior to reaching the resonator 102, and $P_{out}$ is the optical power of light that passes the resonator 102. In FIG. 2, horizontal axis 202 represents frequency, vertical axis 204 represents insertion loss, and curve 206 represents the insertion loss associated with the resonator 102 over a continuum of frequencies. Minima 208-210 of the insertion loss curve 206 correspond to mode resonance frequencies $f_{m-1}=(m-1)c/np$, $f_m=mc/np$, and $f_{m+1}=(m+1)c/np$, respectively. The modes m-1, m, and m+1 represent just three of many modes in the spectrum of frequencies associated with the resonator 102. Light with a frequency f substantially matching any one of the resonances frequencies modes $f_{m-1}$, $f_m$, and $f_{m+1}$ resonates with the resonator 102 and is coupled from the waveguide 104 into the resonator 102. In the narrow frequency regions surrounding the frequencies $f_{m-1}$, $f_m$, and $f_{m+1}$, the insertion loss curve 206 reveals a decrease in the insertion loss the farther a frequency is away from the frequencies $f_{m-1}$, $f_m$, and $f_{m+1}$. In other words, the strength of the resonance between the resonator 102 and light traveling in the waveguide 104 decreases for light with frequencies away $f_{m-}$, $f_m$, and $f_{m+1}$. Light with frequencies in the regions 212-215 pass the resonator 102 substantially undisturbed.

The value of the resonance frequency $f_m$ shifts when the mode index m, effective perimeter p, and/or the effective refractive index n change. When these variations are small the Taylor expansion of the resonance frequency is $$\frac{\delta f_m}{f_m} = \frac{\delta m}{m} - \frac{\delta L}{L} - \frac{\delta n}{n}$$

where $n \equiv n(f,T,q)$ varies due to changes in the frequency f, the temperature T, and the local carrier density q. Combining the Taylor expansion of the resonance frequency with the differential of n.

$$\delta n = \frac{\partial n}{\partial f}\delta f + \frac{\partial n}{\partial T}\delta T + \frac{\partial n}{\partial q}\delta q$$

gives the fractional shift in the resonance frequency of mode m:

$$\frac{\delta f_m}{f_m} = \frac{n}{n_g}\left[\frac{\delta m}{m} - \frac{\delta p}{p}\right] - \frac{1}{n_g}\left[\frac{\partial n}{\partial T}\delta T + \frac{\partial n}{\partial q}\delta q\right]$$

where $n_g=n+f\partial n/\partial f$ is the effective group refractive index. As a result, the fractional change in the physical wavelength can be expressed as $$\frac{\delta\bar{\lambda}}{\bar{\lambda}} = -\left(\frac{n_g}{n}\right)\frac{\delta f}{f}$$

In the case where $\delta m = \pm 1$, $\delta p = 0$, $\delta T = 0$, and $\delta q = 0$, the corresponding frequency separation between adjacent minima 208-210 is given by $$\Delta f_{FSR} = \frac{c}{n_g p}$$

and is called the "free spectral range." The free spectral range characterizes the extent to which frequencies comprising the spectrum frequencies associated with a resonator are separated. The free spectral range also reveals that the spacing between minima 208-210, or spacing between modes in the spectrum of a resonator, is inversely proportional to the effective perimeter p of the resonator. In other words, the free spectral range is larger for a resonator with an effective perimeter that is shorter than a resonator with a longer effective perimeter.

The effective refractive index n and effective perimeter p of a resonator change when the ambient temperature changes. According to the resonance condition, because the resonance frequency $f_m$ is a function of the effective perimeter p and the effective refractive index n, changing the effective refractive index and/or the perimeter produces a corresponding change in the resonance frequency of the resonator. For example, a shift in the resonance frequency can be expressed as:

$$\frac{\delta f_m}{f_m} = -\frac{\delta T}{n_g}\left[\frac{n}{p}\frac{\partial p}{\partial T} + \frac{\partial n}{\partial T}\right]$$

where $p \equiv p(T)$, $\delta m = 0$ and $\delta q = 0$ in the expression for the fractional shift in the resonance frequency. A temperature corresponding to a particular resonance frequency is referred to as the "resonance temperature" and is denoted by $T_{res}$. Because the resonator's effective refractive index n and the effective perimeter p can be changed by varying the resonator's temperature, the resonance frequency of a resonator can be changed by applying heat or allowing heat to dissipate from the resonator in a process called "thermal tuning."

Resonators can also be composed of semiconductor materials that exhibit electro-optic behavior. The effective refractive index of an electro-optic material is changed when an electric field is applied to the material or charge carriers are injected into the material. For example, the resonance frequency shift of a resonator can be expressed as:

$$\frac{\delta f_m}{f_m} = -\frac{1}{n_g}\frac{\partial n}{\partial q}\delta q$$

where $\delta m = 0$, $\delta T = 0$, and $\delta p = 0$ in the expression for the fractional shift in the resonance frequency. The resonance frequency of a resonator can be changed by injecting current into the resonator (i.e., current tuning) or by applying a voltage to the resonator (i.e., electro-optic tuning). Both processes are referred to as "electronic tuning."

Figure 3:
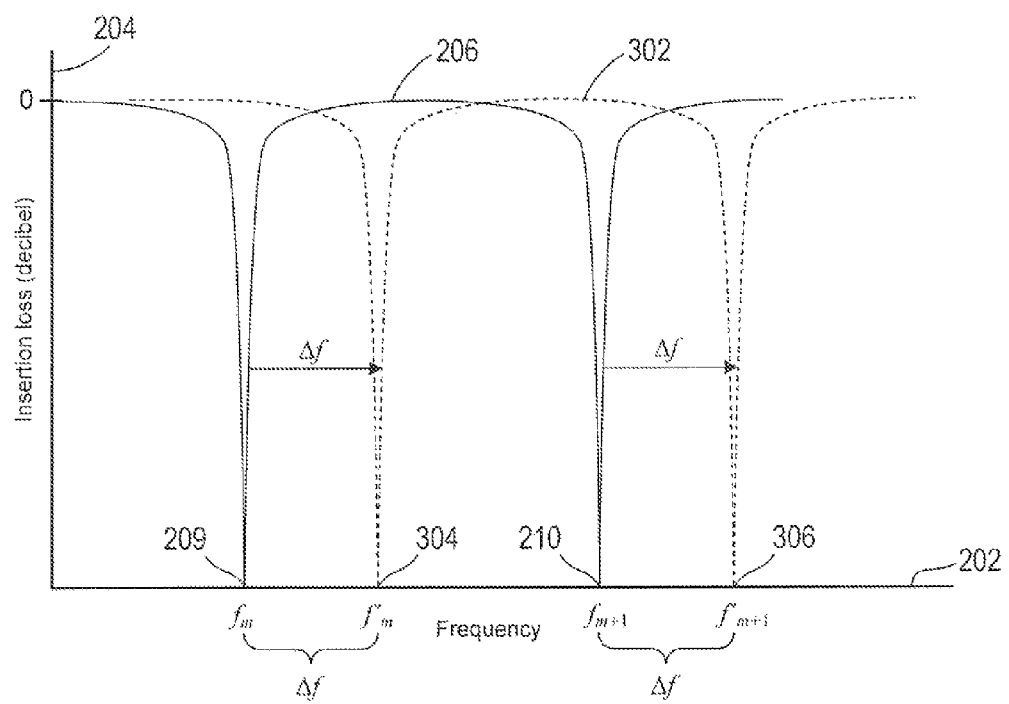
FIG. 3 shows an example plot of insertion loss versus wavelength for a microring resonator and a waveguide where the resonance wavelength of the microring resonator is shifted.

FIG. 3 shows a plot of insertion loss versus frequency represented by dashed-line curve 302 for the resonator 102 and the waveguide 104, where the effective refractive index n and/or the effective perimeter p are changed as a result of temperature tuning or electronic tuning. The example of FIG. 3 represents using tuning to change the effective refractive index n and/or the effective perimeter p of the resonator 102, which in turn causes a shift in the resonance frequency of the resonator 102 by $\Delta f$. As shown in FIG. 3, resonator tuning shifts the resonance frequencies $f_m$ and $f_{m+1}$ represented by the insertion loss minima 209 and 210 to resonance frequencies $f'_m$ and $f'_{m+1}$ represented by insertion loss minima 304 and 306. Curves 302 and 206 reveal that when the resonator 102 is tuned away from the resonance condition represented by curve 206 and into the resonance condition represented by the curve 302, light with either of the frequencies $f_m$ and $f_{m+1}$ is no longer coupled from the waveguide 104 into the resonator 102, but instead, light with either of the frequencies $f'_m$ and $f'_{m+1}$ is coupled from the waveguide 104 into the resonator 102.

Figure 4A:
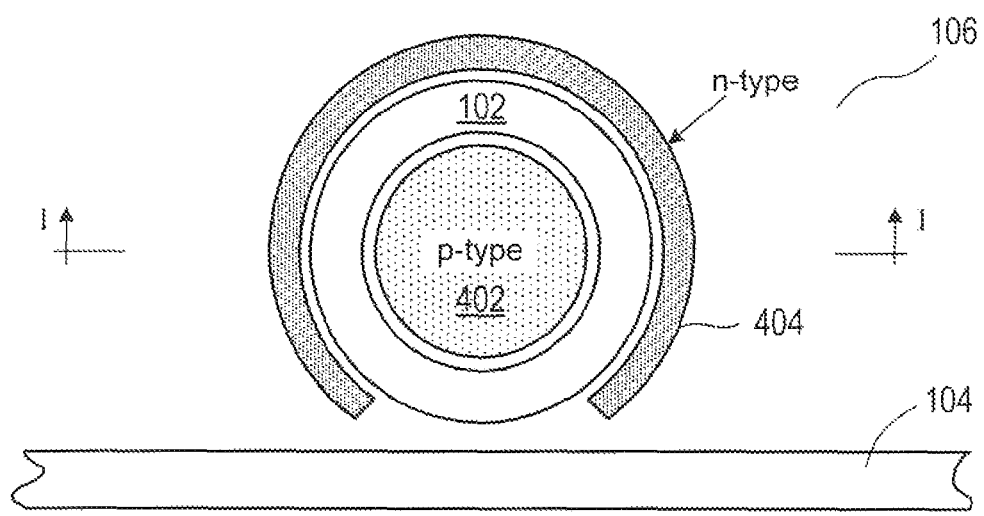
FIGS. 4A-4B show schematic representations from a top view and a cross-sectional view of doped regions surrounding a microring resonator.
Figure 4B:
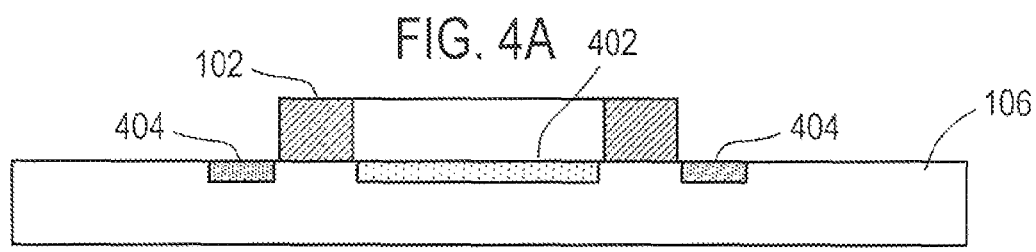

The resonator 102 can be electronically tuned by doping regions of the substrate 106 surrounding the resonator 102 with appropriate electron donor and electron acceptor atoms or impurities. FIG. 4A shows a schematic representation and top view of doped regions surrounding the resonator 102 and the ridge waveguide 104. FIG. 4B shows a cross-sectional view of the resonator 102 along a line I-I in FIG. 4A. In this example, the resonator 102 is composed of an intrinsic semiconductor. A p-type semiconductor region 402 can be formed in the semiconductor substrate interior of the resonator 102, and an n-type semiconductor 404 can be formed in the semiconductor substrate 106 surrounding the outside of the resonator 102. The p-type region 402 and the n-type regions 404 form a p-i-n junction with the resonator 102. In other examples, the dopants can be reversed in order to form an n-type semiconductor region in the substrate interior of the resonator 102 and a p-type semiconductor region in the substrate surrounding the outside of the resonator 102.

Figure 5A:
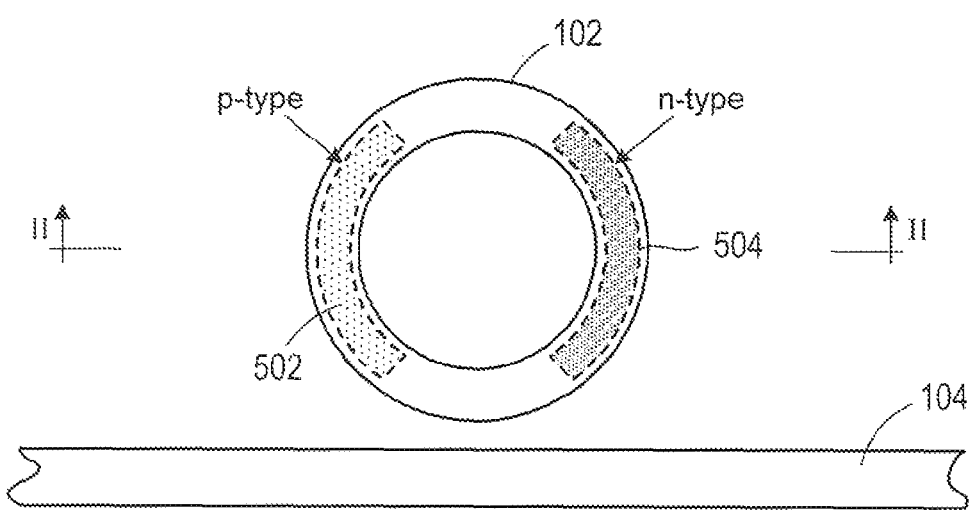
FIGS. 5A-5B show schematic representations from a top view and a cross-sectional view of doped regions beneath a microring resonator.
Figure 5B:
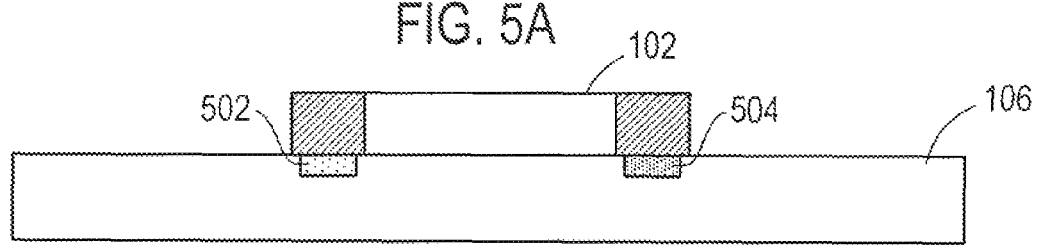

FIG. 5A shows a schematic representation and top view of doped regions beneath the resonator 102. FIG. 5B shows a cross-sectional view of the resonator 102 along a line II-II in FIG. 5A. In this example, the resonator 102 is also composed of an intrinsic semiconductor. A p-type semiconductor region 502 is formed in the semiconductor substrate 106 beneath a portion of the resonator 102 and an n-type semiconductor 504 is formed in the semiconductor substrate 106 beneath a different portion of the resonator 102. The p-type region 502 and the n-type regions 504 form a p-i-n junction with the resonator 102.

The resonator 102 represented in FIGS. 4 and 5 can be composed of an elemental semiconductor, such as Si and germanium ("Ge"), or a III-V compound semiconductor, where Roman numerals III and V represent elements in the IIIa and Va columns of the Periodic Table of the Elements. Compound semiconductors can be composed of column IIIa elements, such as aluminum ("Al"), gallium ("Ga"), and indium ("In"), in combination with column Va elements, such as nitrogen ("N"), phosphorus ("P"), arsenic ("As"), and antimony ("Sb"). Compound semiconductors can also be further classified according to the relative quantities of III and V elements. For example, binary semiconductor compounds include semiconductors with empirical formulas GaAs, InP, InAs, and GaP; ternary compound semiconductors include semiconductors with empirical formula $GaAs_yP_{1-y}$, where y ranges from greater than 0 to less than 1; and quaternary compound semiconductors include semiconductors with empirical formula $In_xGa_{1-x}As_yP_{1-y}$, where both x and y independently range from greater than 0 to less than 1. Other types of suitable compound semiconductors include II-VI materials, where II and VI represent elements in the IIb and VIa columns of the periodic table. For example, CdSe, ZnSe, ZnS, and ZnO are empirical formulas of exemplary binary II-VI compound semiconductors.

P-type impurities can be atoms that introduce vacant electronic energy levels called "holes" to the electronic band gaps of the resonator 102. These impurities are also called "electron acceptors." N-type impurities can be atoms that introduce filled electronic energy levels to the electronic band gap of the resonator 102. These impurities are called "electron donors." For example, boron ("B"), Al, and Ga are p-type impurities that introduce vacant electronic energy levels near the valence band of Si; and P, As, and Sb are n-type impurities that introduce filled electronic energy levels near the conduction band of Si. In III-V compound semiconductors, column VI impurities substitute for column V sites in the III-V lattice and serve as n-type impurities, and column II impurities substitute for column III atoms in the III-V lattice to form p-type impurities.

The resonator 102 p-i-n junctions represented in FIGS. 4 and 5 can be operated in forward- or reverse-bias modes. Under a forward bias, a change in the effective refractive index of the microring 102 is induced through current injection. Under a reverse bias, an electrical field can be formed across the resonator 102 and a refractive index change can result from the electro-optic effect or charge depletion effect. Both of these electronic tuning techniques typically provide a relatively small shift in the effective refractive index of the resonator 102.

Figure 6:
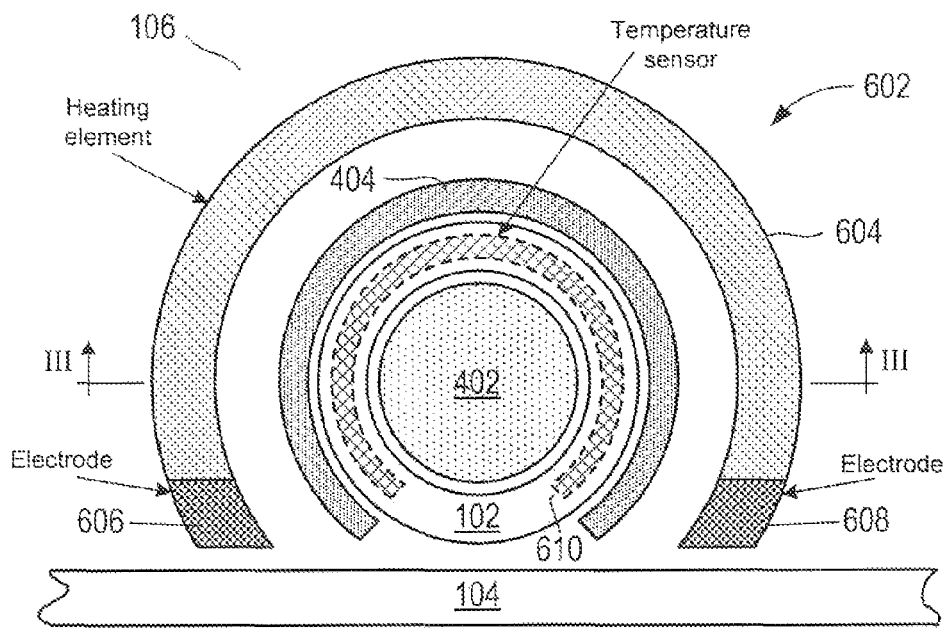
FIG. 6 shows a schematic representation from a top view of an example microring heating element 602.

The resonator 102 can be thermally tuned by applying heat directly to the resonator 102 or applying heat to a region surrounding the resonator 102. FIG. 6 shows a schematic representation and top view of an example heating element 602 composed of a resistive region 604 partially surrounding the resonator 102, shown in FIG. 4, and electrodes 606 and 608 located at the ends of the region 608. The heating element 604 is composed of materials that through the process of Joule heating convert electrical current supplied via a variable current control into heat. In certain examples, the element 604 can be composed of a p-type semiconductor or an n-type semiconductor, and the contacts 606 and 608 can be composed of a metal, such as gold, silver, platinum, copper, or another suitable conductor. In other examples, the contacts 606 and 608 can be omitted and the element 604 can be composed of platinum, nichrome, silicon carbide, molybdenum disilicide, or another suitable metal or alloy that through resistance converts electrical current into heat. FIG. 6 also shows a temperature sensor 610 embedded in the substrate 106 beneath a portion of the resonator 102. The temperature sensor 610 can be used to monitor temperature changes in the resonator 102. The temperature sensor 610 can be a semiconductor diode-based or transistor-based thermometer embedded within the substrate and located adjacent to at least a portion of the resonator 102, the temperature sensor can be disposed on the surface of the substrate adjacent to the resonator 102. Diode and transistor-based thermometry is typically carried out by forward biasing the sensor 610 with a substantially constant current and measuring the resulting forward voltage drop or increase that occurs with a change in the temperature.

Figure 7A:
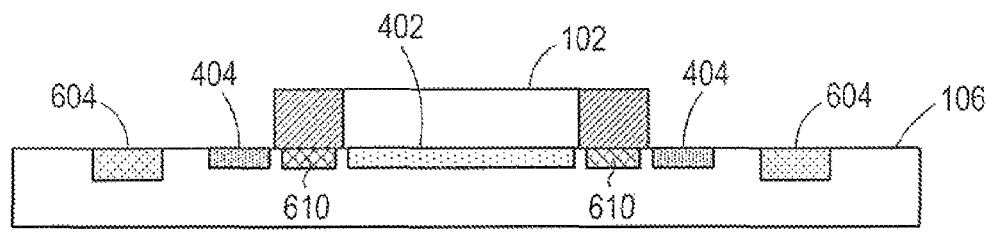
FIGS. 7A-7B show cross-sectional views of the microring resonator shown in FIG. 6 along a line III-III.
Figure 7B:
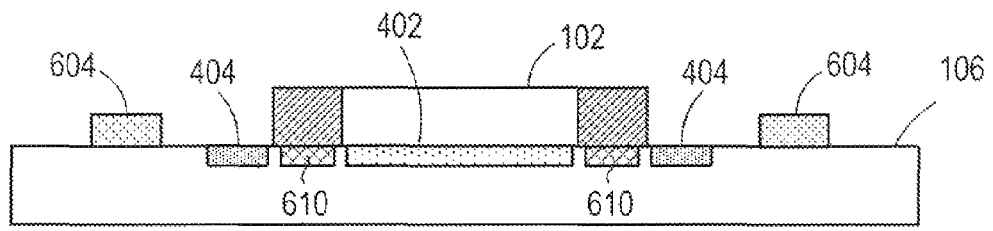

In certain examples, the heating element can be formed within the substrate 106 or the heating element can be disposed on the surface of the substrate 106. FIGS. 7A-7B show cross-sectional views of the resonator 102 shown in FIG. 6 along a line III-III. In the example of FIG. 7A, the element 604 is embedded with the substrate 106. In the example of FIG. 7B, the element 604 is disposed on the substrate 106.

Figure 8A:
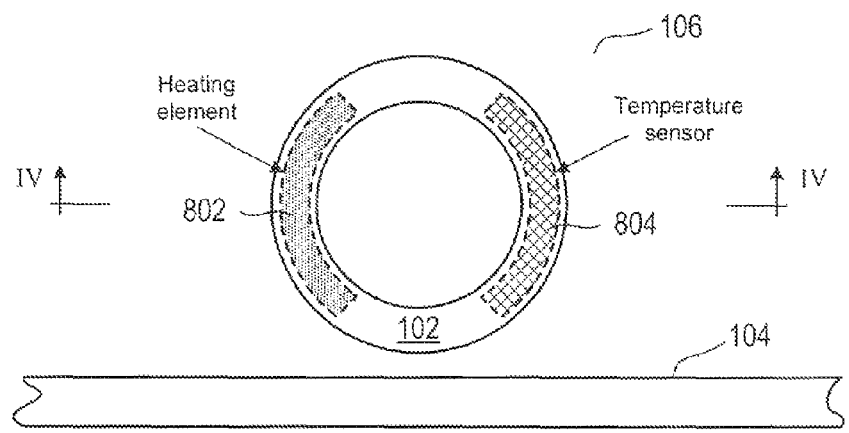
FIGS. 8A-8B show schematic representations from a top view and a cross-sectional view of a heating element and a temperature sensor embedded within a substrate beneath portions of a microring resonator.
Figure 8B:
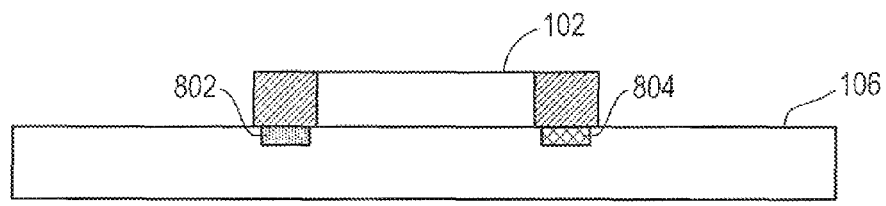

The heating element and temperature sensor can also be located in other locations near the resonator. FIG. 8A shows a schematic representation and top view of a heating element 802 and a temperature sensor 804 embedded within the substrate 106 beneath portions of the resonator 102. FIG. 8B shows a cross-sectional view of the resonator 102 along a line in FIG. 8A.

A thermally or electronically tunable resonator can be tuned into resonance with the frequency of an optical signal by applying an appropriate voltage to the doped regions and/or the heating element. For example, the resonator 102, shown in FIG. 6, can be configured with an effective perimeter p' and an effective refractive index n' such that an optical signal with a frequency f propagating along the waveguide 104 does not match the resonance condition:

$$f \neq f_m = \frac{mc}{n'p'}$$

The optical signal passes the resonator 102 undisturbed and the resonator 102 is said to be turned "off" with respect to the frequency f. On the other hand, applying an appropriate voltage or amount of heat to the resonator 102 causes the effective refractive index n' and/or effective perimeter p' to shift so that the optical signal satisfies the resonance condition:

$$f \approx f_m = \frac{mc}{np}$$

As a result, the optical signal is coupled from the waveguide 104 into the resonator 102 and the resonator 102 is said to be turned "on."

Figure 9:
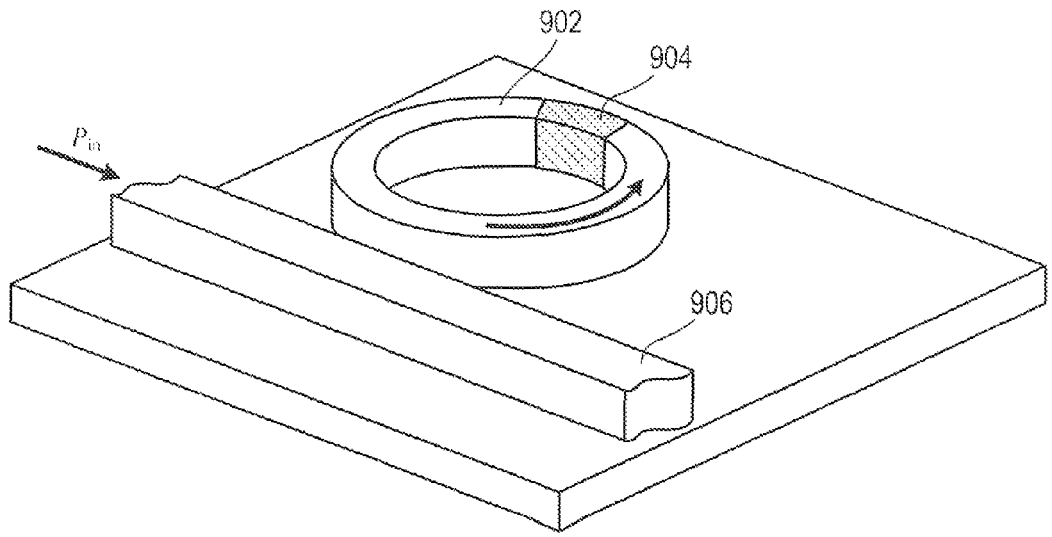
FIG. 9 shows an example of a resonator with a doped detector region embedded within a portion of the resonator.

Because of the evanescent coupling properties of resonators, resonators can also be used to detect particular optical signals transmitted along an adjacent waveguide. FIG. 9 shows an example of the resonator 902 with a doped detector region 904 embedded within a portion of the resonator 902. The detector portion 904 can be a SiGe doped region of the resonator 902. The resonator 902 and doped detector region 904 in combination form a detector. For example, an optical signal having a frequency that is resonant with the resonator 902 is evanescently coupled from the waveguide 906 into the resonator 902 and remains trapped for a period of time within the resonator 902. The detector portion 904 converts the optical signal into an electronic signal that can be transmitted over a signal line to an electronically coupled node or device.

Figure 10:
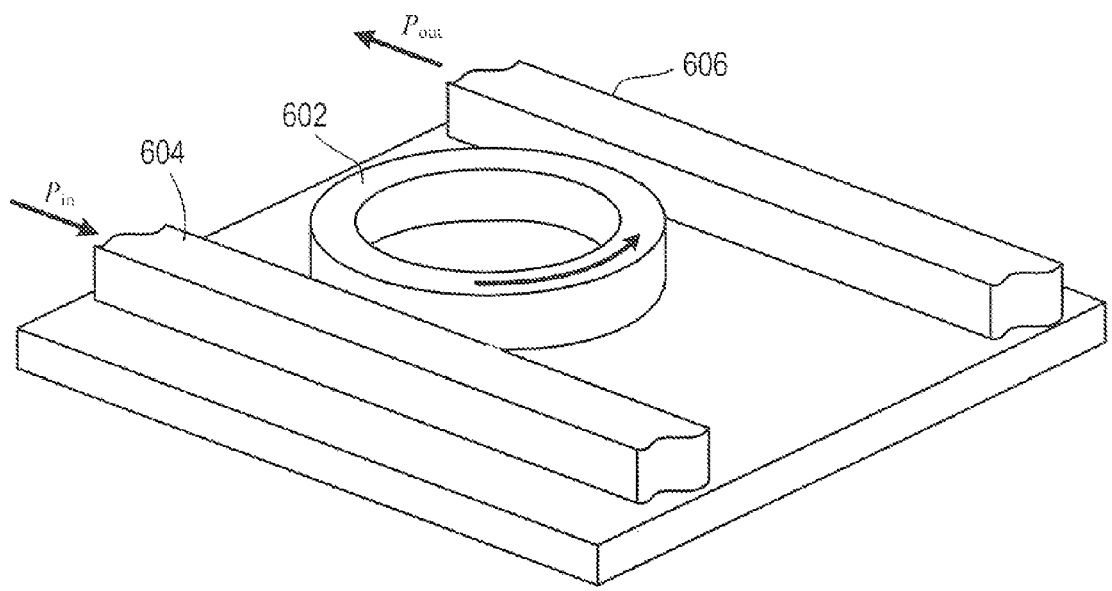
FIG. 10 shows a resonator used as a drop/add filter to couple a channel from a first waveguide into a second waveguide.

FIG. 10 shows a resonator 602 used as a drop/add filter to couple a channel from a first waveguide 604 into a second waveguide 606. A channel having a frequency that is resonant with the resonator 602 is evanescently coupled from the first waveguide 604 into the resonator 602 where the channel circulates within the resonator 602 and is evanescently coupled into the second waveguide 606. Note that the channel is transmitted along the first waveguide 604 in one direction and is transmitted in the second waveguide 606 in the opposite direction. Other channels with frequencies that are not resonant with the resonator 602 are not evanescently coupled form the waveguide 604 into the waveguide 606. The resonance frequencies of the resonator 602 can be controlled with doped regions surrounding the resonator 102 as described above with reference to FIGS. 4-8.

Figure 11A:
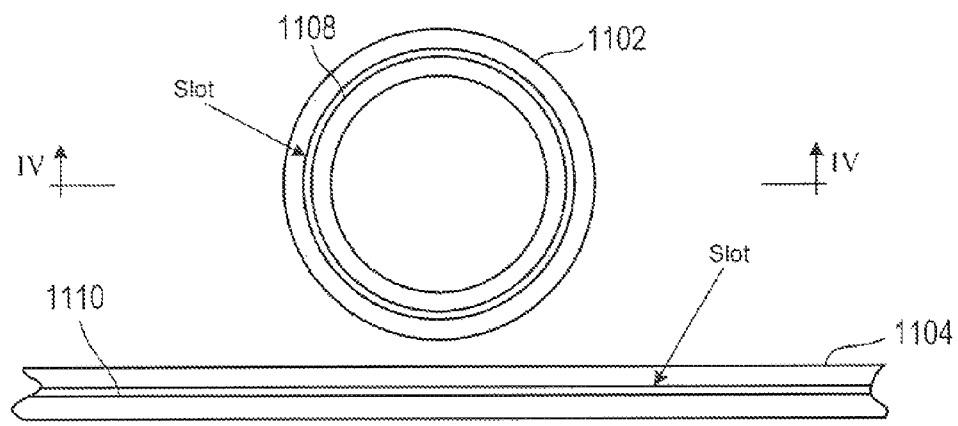
FIGS. 11A-11B show schematic representations from a top view and a cross-sectional view of an example slotted microring resonator and slotted waveguide.
Figure 11B:
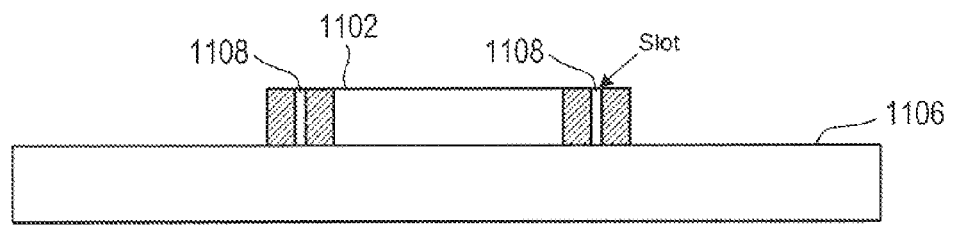

The term "resonator" as used to describe various examples in FIG. 1-10 is not intended to be limited to microrings. The term "resonator" can also be used to refer to a microdisk, which can be configured and operated in substantially the same manner as the microrings described above. The term "resonator" can also be used to refer to slotted microrings. FIG. 11 shows a schematic representation and top view of an example slotted microring 1102 and slotted waveguide 1104. FIG. 11B shows a cross-sectional view of the slotted microring 1102 disposed on a substrate 1106. The slotted microring 1102 and slotted waveguide 1104 are formed from a low refractive index material comprising the slots 1108 and 1110 surrounded by higher refractive index material. Light of an appropriate resonance frequency circulates within the slot 1108 and can be evanescently coupled from the slot 1110 into the slot 1108.

Tunable Resonator Systems

Figure 12:
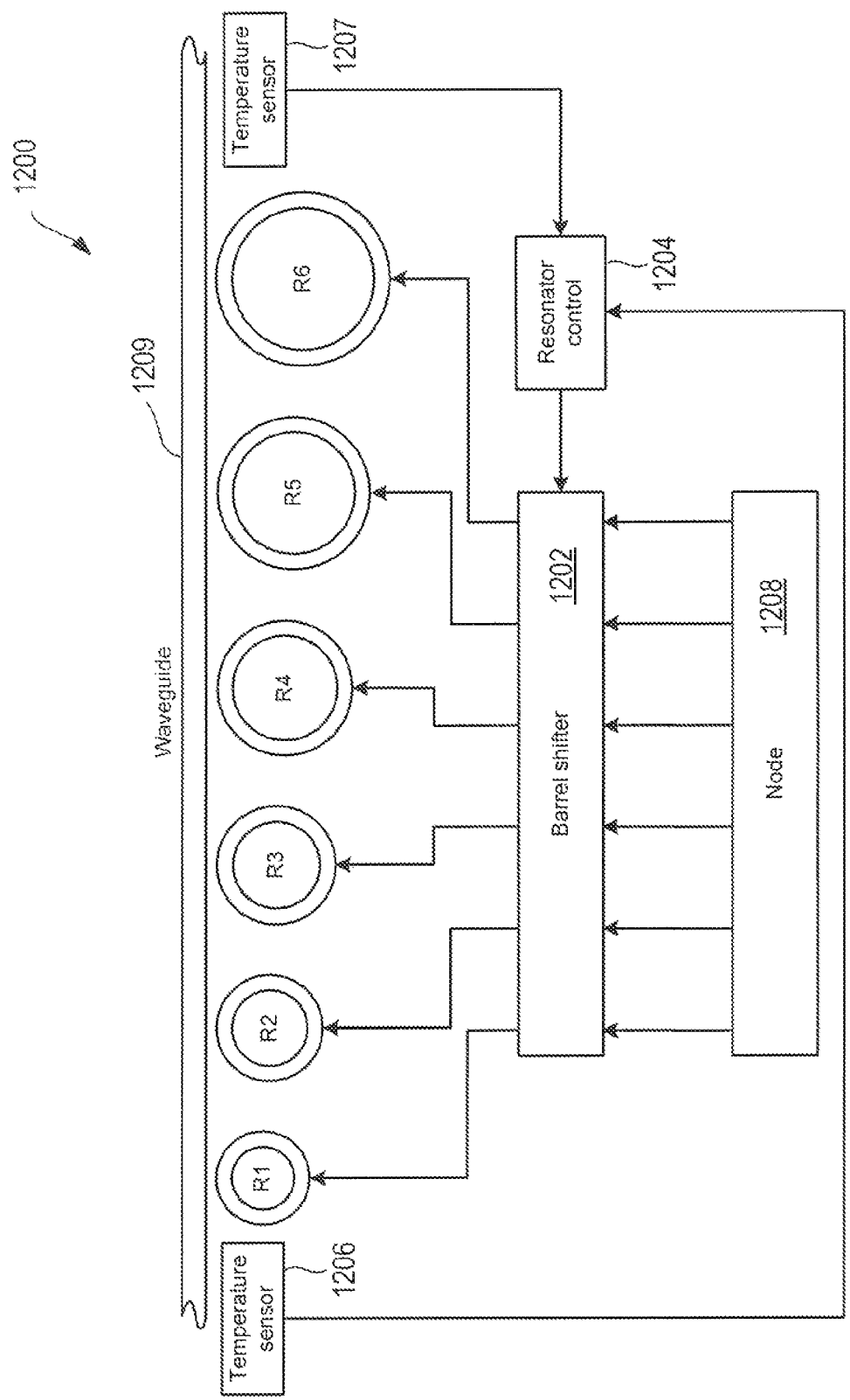
FIGS. 12-13 show schematic representation of example tunable resonator systems with temperature sensors.

FIG. 12 shows a schematic representation of an example tunable resonator system 1200. The system 1200 includes an array of six resonators denoted by R1-R6, a barrel shifter 1202, a resonator control 1204, and temperature sensors 1206 and 1207. In FIG. 12, and in subsequent figures, directional arrows represent electronic signal lines and the direction electronic signals can be sent between devices over the signal lines. FIG. 12 shows the resonators R1-R6 located adjacent to a waveguide 1209, temperature sensors 1206 and 1207 and the barrel shifter 1202 are electronically connected to the resonator control 1204, and a node 1208 is electronically connected to the barrel shifter 1202. The node 1208 can be any combination of processors, memory, memory controller, electrical-to-optical engine, optical-to-electrical engine, a cluster of multi-core processing units, a circuit board, an external network connection, or any other data processing, storing, or transmitting device.

The temperature sensors 1206 and 1207 can be diode- or transistor-based thermometers disposed on the surface of the substrate adjacent to the resonators R1-R6 or embedded within the substrate near the resonators R1-R6, as described above with reference to FIG. 6. The resonator control 1204 is an electronic device that measures changes in voltages across the sensors 1206 and 1207 and uses the change in voltages to determine the average or median temperature, T, of the substrate surrounding the resonators R1-R6.

Figure 13:
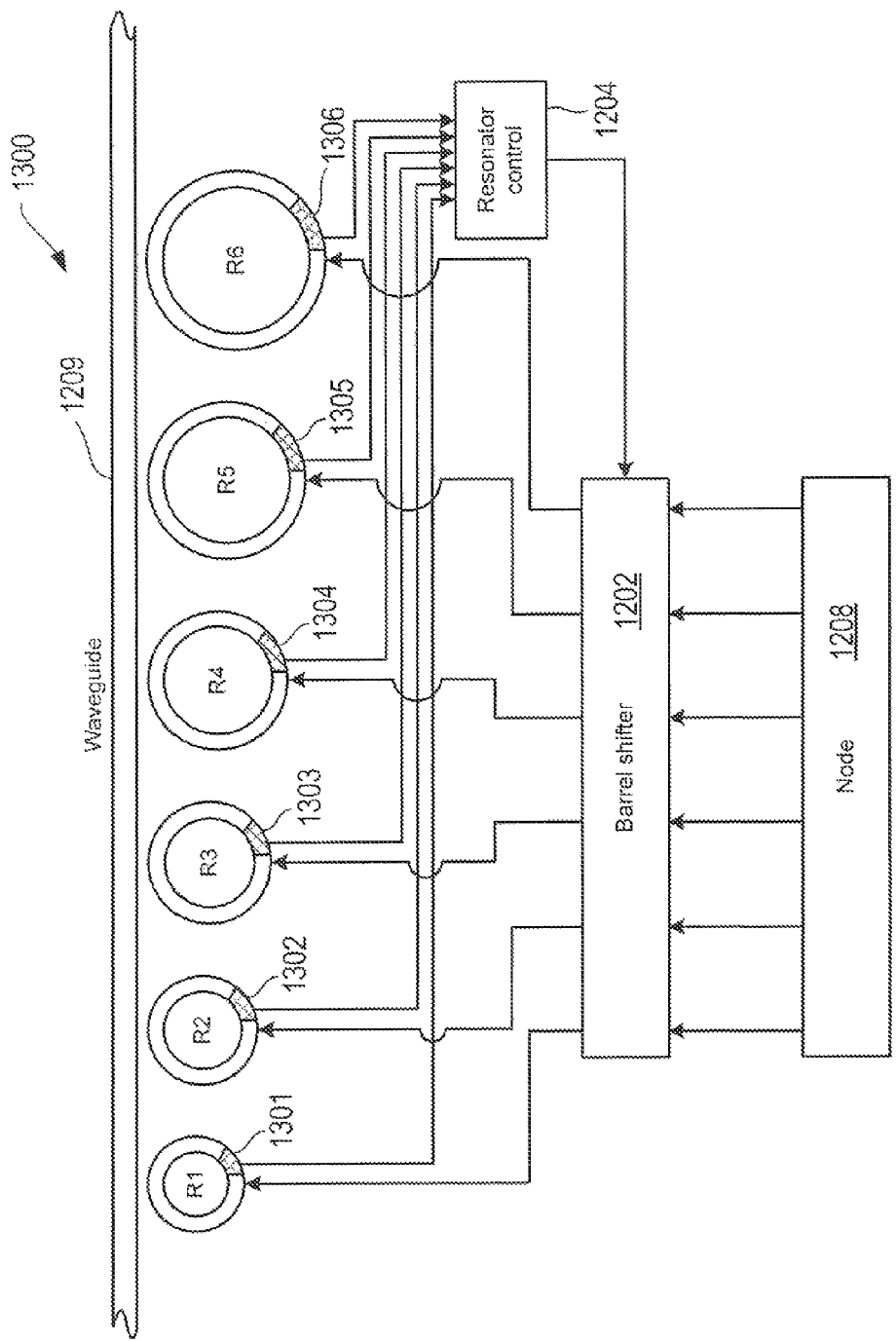

Tunable resonator systems are not limited to two temperature sensors disposed in the positions represented in FIG. 12. Any suitable number of temperature sensors can be used and positioned in various locations around the array of resonators. FIG. 13 shows a schematic representation of a tunable resonator system 1300. The system 1300 is similar to the system 1200 except the temperature sensors 1206 and 1207 are replaced by temperature sensors 1301-1306 located adjacent to each of the resonators R1-R6, respectively. In the example of FIG. 13, each temperature sensor is embedded within the substrate adjacent to a portion of a resonator, as described above with reference to FIGS. 6-8. Temperature sensors 1301-1306 are each electronically connected to the resonator control 1204. The resonator control 1204 can determine the temperature T of the resonators R1-R6 by calculating the average or median temperature based on changes in the voltages output from the sensors 1301-1306.

Figure 14A:
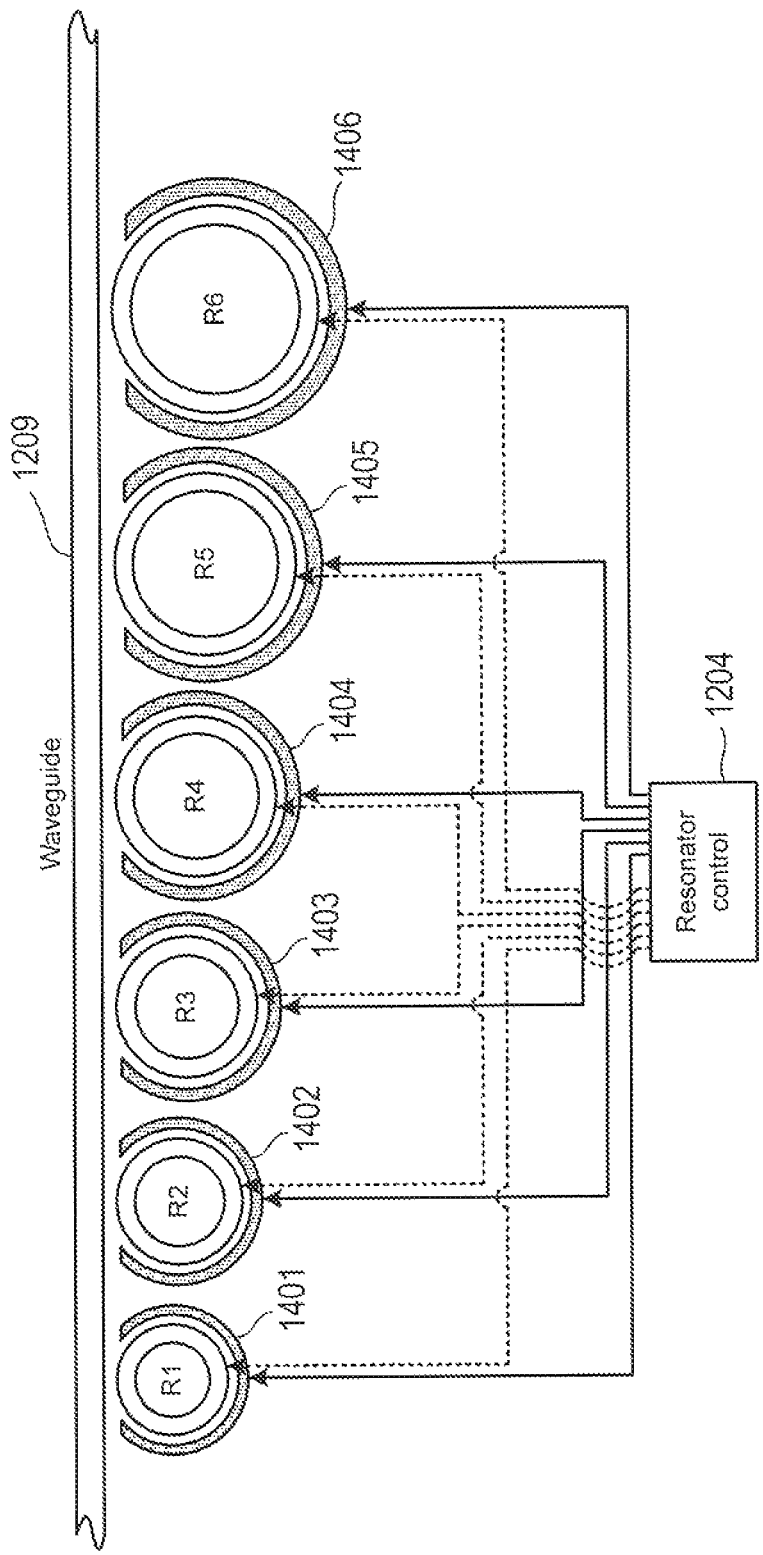
FIGS. 14A-14B show schematic representations of two types of heating elements used to control the temperature of microring resonators of a tunable resonator system.

The systems 1200 and 1300 also include at least one heating element (not shown in FIGS. 12 and 13) to control the temperature of the resonators R1-R6. FIG. 14A shows a schematic representation of an example tunable resonator system with separate heating elements 1401-1406 electronically connected to the resonator control 1204. Note that for the sake of simplicity, the barrel shifter, node, and temperature sensors are not shown in FIG. 14A. The heating elements 1401-1406 can be used to thermally tune the resonators R1-R6, as described above with reference to FIGS. 6-7. In the example of FIG. 14A, based on the temperature T, the resonator control 1204 determines an amount of current to apply separately to each of the heating elements 1401-1406. The amount of current applied to each heating element corresponds to an amount of heat, H, used to thermally tune the resonance frequencies of the resonators R1-R6. FIG. 14A also shows the resonator control 1204 electronically connected to each of the resonators R1-R6. When the resonators are p-i-n junctions, as described above with reference to FIGS. 4-5, the resonator control 1204 may also be used to apply a forward or reverse bias to the resonators to electronically tune the resonance frequencies of the resonators R1-R6 based on the temperature T.

Figure 14B:
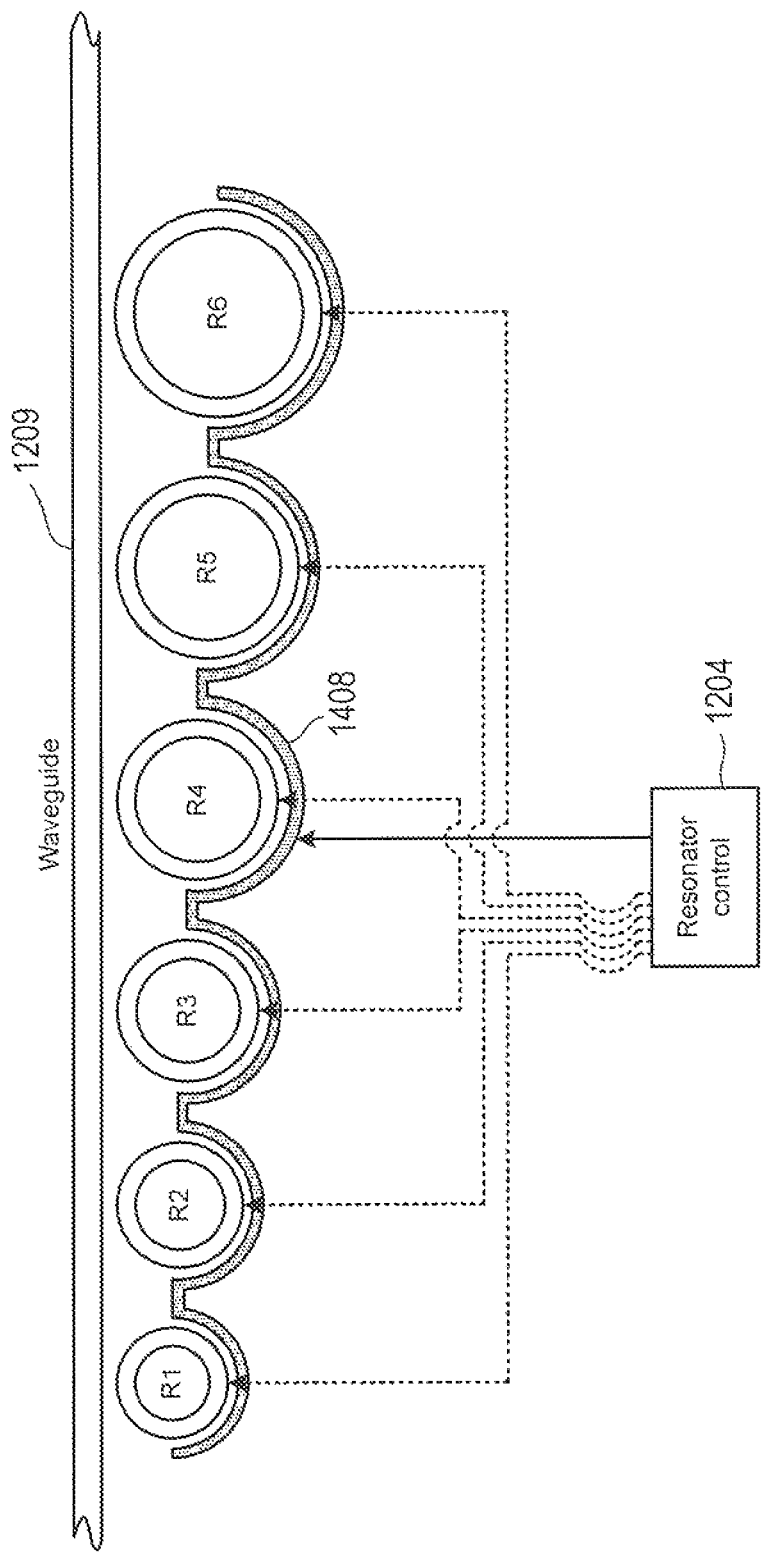

FIG. 14B shows a schematic representation of an example tunable resonator system with a single heating element 1408 electronically connected to the resonator control 1204. Barrel shifter, node, and temperature sensors are also not shown in FIG. 14B. The heating element 1408 can be used to thermally tune the resonators R1-R6, as described above with reference to FIGS. 6-7. In the example of FIG. 14B, based on the temperature T, the resonator control 1204 determines an amount of current to apply to the heating element 1408, which corresponds to an amount of heat, H, used to thermally tune the resonance frequencies of the resonators R1-R6.

Figure 15:
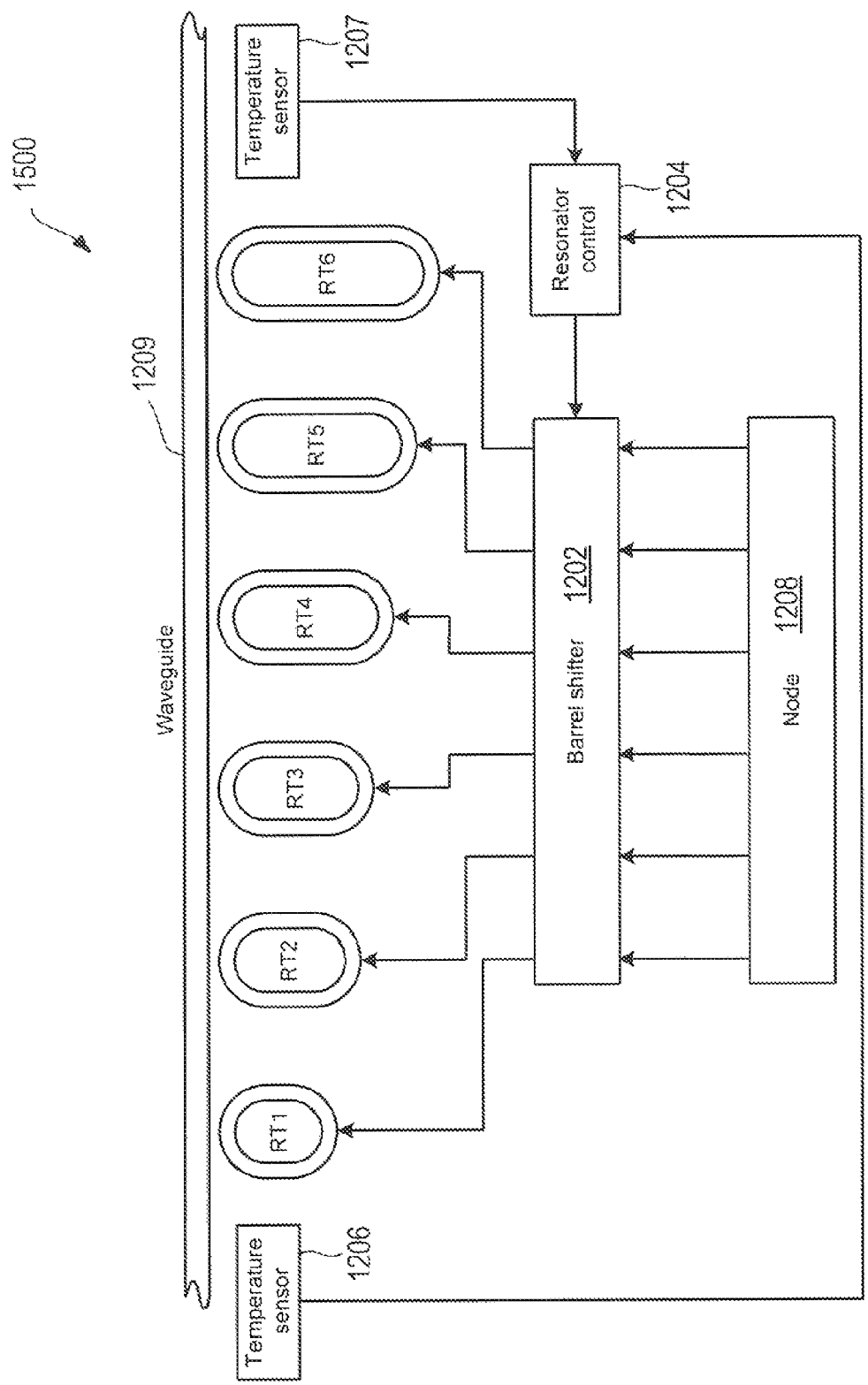
FIG. 15 shows a schematic representation of an example tunable resonator system with racetrack-shaped microring resonators.

Tunable resonator systems are not limited to using circular microring resonators, as represented in FIGS. 12-13. The resonators can be slotted microrings, microdisks, or racetrack-shaped microrings. FIG. 15 shows a schematic representation of an example tunable resonator system 1500. The system 1500 is similar to the system 1200 except the resonators R1-R6 of system 1200 are replaced with racetrack-shaped microring resonators RT1-RT6.

Figure 16A:
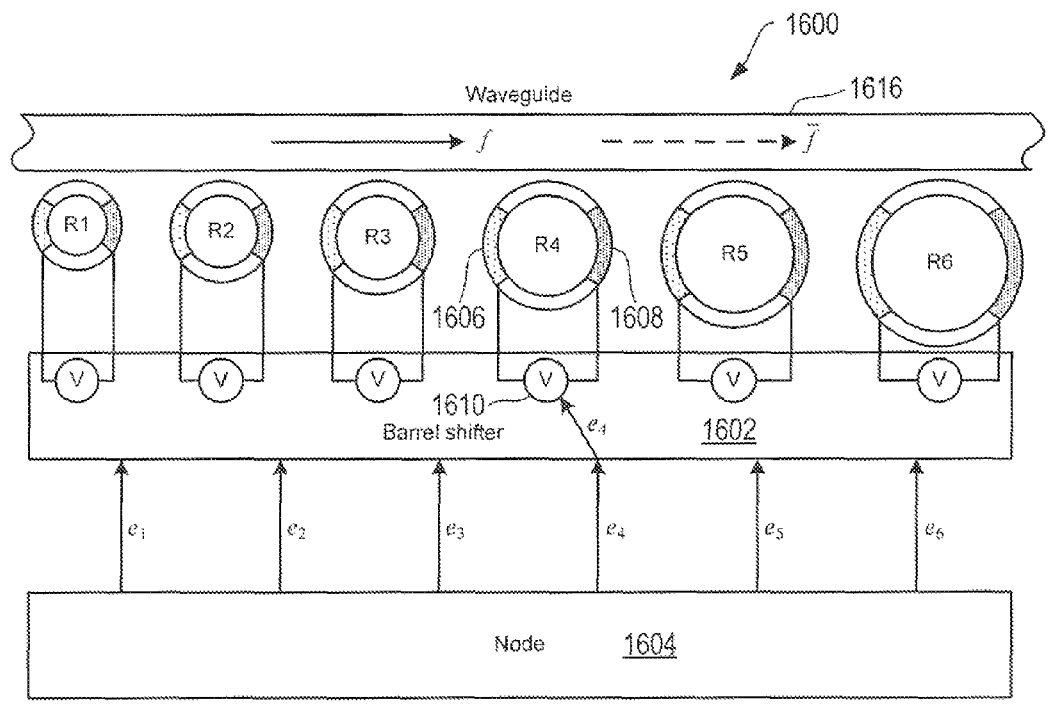
FIGS. 16A-16C show tunable resonator systems configured to operate as a modulator array, a drop/add filter array, and a detector array, respectively.
Figure 16A:
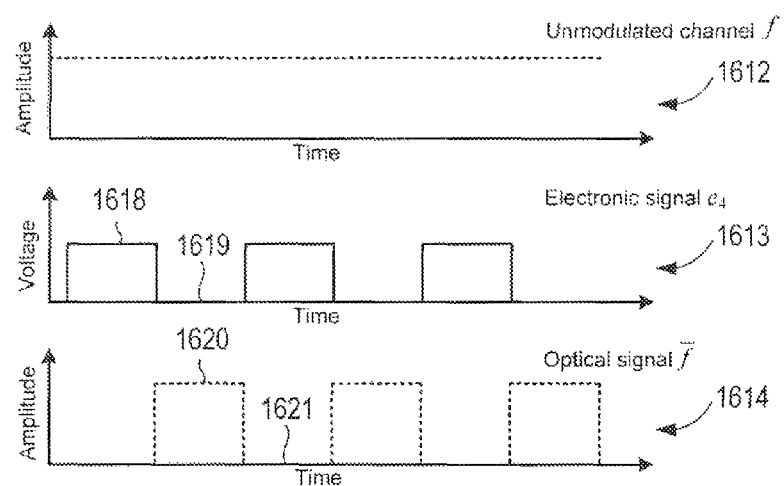
Figure 16B:
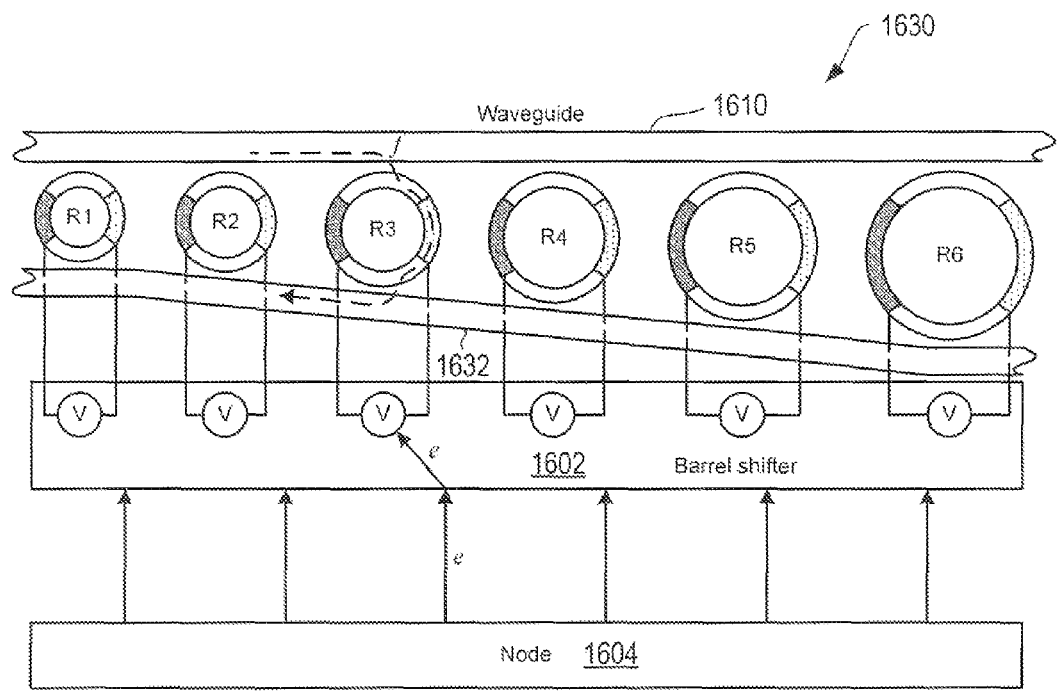
Figure 16C:
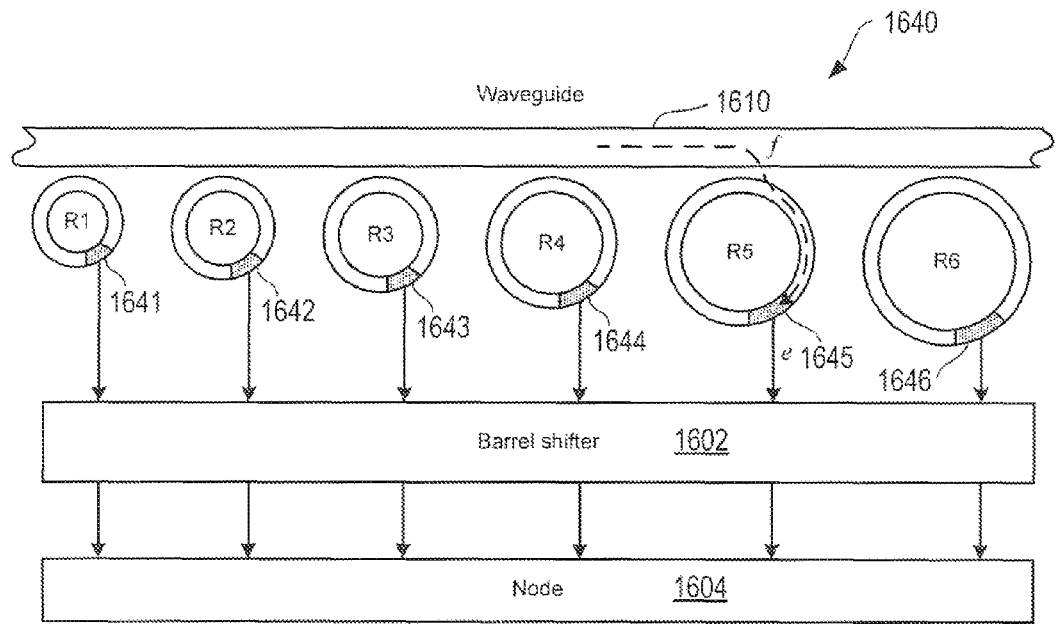

A tunable resonator system can be configured to operate as a modulator array, a drop/add filter array, or a detector array. FIGS. 16A-16C show tunable resonator systems configured to operate as a modulator array, a drop/add filter array, and a detector array, respectively.

FIG. 16A shows an example tunable resonator system 1600 configured to operate as a modulator array. For the sake of simplicity, the temperature sensors and resonator control are not shown. In the example of FIG. 16A, each resonator can be a p-i-n junction resonator with p-type and n-type regions formed in the substrate beneath each resonator, as described above with reference to FIG. 5. The resonators R1-R6 can also be p-i-n junctions described above with reference to FIG. 4. The p-type and n-type regions associated with each resonator are electronically connected to a voltage source. The voltage sources are operated by the barrel shifter 1602 to modulate the resonance frequencies of the resonators R1-R6. A node 1604 sends electronic signals $e_1$-$e_6$ to the barrel shifter 1602, as described above with reference to FIG. 12. The barrel shifter 1602 applies the electronic signals to the voltage sources to independently modulate the resonance frequency of each resonator. For example, the barrel shifter 1604 sends the electronic signal $e_4$ to a voltage source 1610 to modulate the resonance frequency of the resonator R4.

FIG. 16A includes example time plots 1612-1614 of a channel f, the electronic signal $e_4$, and an optical signal $\bar{f}$, respectively. The time plots represent generating the optical signal $\bar{f}$ from the electronic signal $e_4$ produced by the node 1604. Amplitude versus time plot 1612 represents the unmodulated channel f traversing a waveguide 1616. Suppose the resonator R4 is used to modulate the amplitude of the channel f. Voltage versus time plot 1613 represents the electronic signal $e_4$ comprising alternating high 1618 and low 1619 voltages. A high voltage can represent a logic bit value "1" and a low or no voltage can represent a logic bit value "0," or vice versa. The resonator R4 can be configured so that while a high voltage 1618 is applied to the resonator R4, the resonator R4 is resonant with the channel f, enabling the channel to be evanescently coupled from the waveguide 1616 into the resonator R4 while the high voltage is applied. On the other hand, when a low or no voltage 1619 is applied, the resonator R4 is switched off resonance with the channel f and the channel passes the resonator R4 unperturbed. Amplitude versus time plot 1614 represents alternating high 1620 and low 1621 amplitudes of the optical signal $\bar{f}$ produced by the electronic signal $e_4$. Each high amplitude 1620 portion of the optical signal $\bar{f}$ corresponds to a low voltage 1619 of the electronic signal $e_4$, and each low amplitude portion 1621 of the optical signal $\bar{f}$ corresponds to a high voltage 1618 of the electronic signal $e_4$. A low or no amplitude portion 1621 can represent a logic bit value "1" and a high amplitude portion 238 can represent a logic bit value "0," or vice versa. Each of the resonators R1-R6 can be operated in the same manner to encode data in a particular channel carried by the waveguide 1610.

Note that in other examples, the resonator R4 can be configured so that while a low or no voltage 1619 is applied to the resonator R4, the resonator R4 is resonant with the channel f, and application of a high voltage 1618 switches the resonator R4 of resonance with the channel f.

FIG. 16B shows an example tunable resonator system 1630 configured to operate as a drop/add filter array. The temperature sensors and resonator control are also not shown, and only the resonators R1-R6 and barrel shifter 1602 of the system 1600 are shown. Like the system 1600 shown in FIG. 16A, each resonator is configured as a p-i-n junction that can be electronically tuned in and out of resonance with a particular channel. In the example of FIG. 16B, the resonators R1-R6 are also located adjacent to a second waveguide 1632 and are operated as drop/add filters to drop or extract channels from the waveguide 1610 and add or inject the channels into the waveguide 1632. For example, suppose the resonator R3 can be electronically tuned into resonance with a channel f traversing the waveguide 1610. Initially, the channel f traverses the waveguide 1610 passing the resonators R1-R6 unperturbed. In order to add the channel f to the waveguide 1632, the node 1604 sends an electronic signal e to the barrel shifter 1602, which, in turn, sends the signal e to a voltage source 1634. The voltage source 1634 outputs an electronic signal that electronically tunes the resonator R3 into resonance with the channel f. As a result, the channel f is coupled from the waveguide 1610 into the resonator R3 (i.e., dropped) and coupled from the resonator R3 into the waveguide 1632 (i.e., added) while the signal e is applied. Each of the resonators R1-R6 can be separately operated in the same manner to selectively drop channels from the waveguide 1610 and add those channels to the waveguide 1632.

FIG. 16C shows an example tunable resonator system 1640 configured to operate as a detector array. The temperature sensors and a resonator control are not shown. In the example of FIG. 16C, the resonators R1-R6 are configured as detectors by including doped regions 1641-1646 that convert optical signals trapped in the resonators into electronic signals that are sent to the barrel shifter 1602 then to the node 1604, as described above with reference to FIG. 9. For example, resonator R5 has resonance with optical signal $\bar{f}$. As shown in FIG. 16C, when the optical signal $\bar{f}$ reaches the resonator R5, the optical signal is extracted from the waveguide 1610 and converted by the region 1645 into an electronic signal e encoding the same information. The electronic signal e is sent to the barrel shifter 1602 and routed by the barrel shifter to the node 1604 for processing.

Operation of Tunable Resonator Systems

A resonator has a tunable temperature range $(T_{th}, T_{th}+\Delta T)$ in which heat can be applied or allowed to dissipate to maintain a resonance temperature $T_{res}$ that corresponds to a particular resonance frequency, as described above in the subsection Tunable Resonators. The tunable temperature range has a lower temperature threshold $T_{th}$ at which joule heating is used to maintain the resonance temperature $T_{res}$ and has an upper temperature limit $T_{th}+\Delta T$, which is the maximum achievable temperature due to a high ambient temperature or power dissipation of other circuits without joule heating. In other words, while the temperature T of the resonator remains in $(T_{th}, T_{th}+\Delta T)$ (i.e., $T \in (T_{th}, T_{th}+\Delta T)$) the resonance temperature $T_{res}$ can be maintained by applying an appropriate amount of heat and the corresponding resonance frequency of the resonator remains unchanged. However, when ambient conditions are such that $T \notin (T_{th}, T_{th}+\Delta T)$, the resonance temperature $T_{res}$ can no longer be maintained and the corresponding resonance frequency changes.

The temperature of an array of resonators integrated with CMOS-nanophotonic systems fluctuates over time due to changes in the power consumption and temperature of neighboring circuitry. Systems and methods described herein are directed to establishing and maintaining an appropriate resonance temperature $T_{res}$ for an array of resonators in response to changes in the ambient temperature or in response to a frequency shift in the channels generated by a laser, which also occurs as a result of ambient temperature changes and is referred to as laser drift. An array of resonators also has a tunable temperature range $(T_{th}, T_{th}+\Delta T)$. While the temperature $T \in (T_{th}, T_{th}+\Delta T)$, the resonance temperature $T_{res}$ can be maintained by applying an appropriate amount of heat and the resonance frequencies of the resonators are unchanged. However, when ambient conditions are such that $T \notin (T_{th}, T_{th}+\Delta T)$, the resonance temperature $T_{res}$ can no longer be maintained and the resonance frequencies shift. The resonators of the resonator systems described above are configured so that when $T \notin (T_{th}, T_{th}+\Delta T)$, a different resonator to resonance frequency correspondence is established with the same set of resonance frequencies but at a different resonance temperature $T'_{res}$. This is accomplished by fabricating the resonators so that the resonance frequency of each resonator shifts into a resonance frequency mode of an adjacent resonator when an appropriate amount of heat is applied, while still maintaining the resonance frequency spacing between adjacent resonators. The resonance frequency of a resonator located at one end of the array of resonators is shifted to match the resonance frequency mode of a resonator located at the opposite end of the array of resonators.

Methods for tuning a tunable resonator system to account for ambient temperature changes are now described with reference to an example tunable resonator system with an array of six resonators. These same methods can be used to correct for laser drift. Note that for the sake of brevity, thermal tuning is the technique used to describe methods of tuning the resonance frequencies of an array of resonators in accordance with ambient temperature. In practice, however, methods are not intended to be so limited. Electronic tuning can also be used and can be applied in an analogous manner to tune the resonance frequencies of the array of resonators. In other words, in the description below, rather than applying heat to shift the resonance frequencies of the resonators, current can be applied instead of heat to shift the resonance frequencies of the resonators and achieve the same results.

Figure 17:
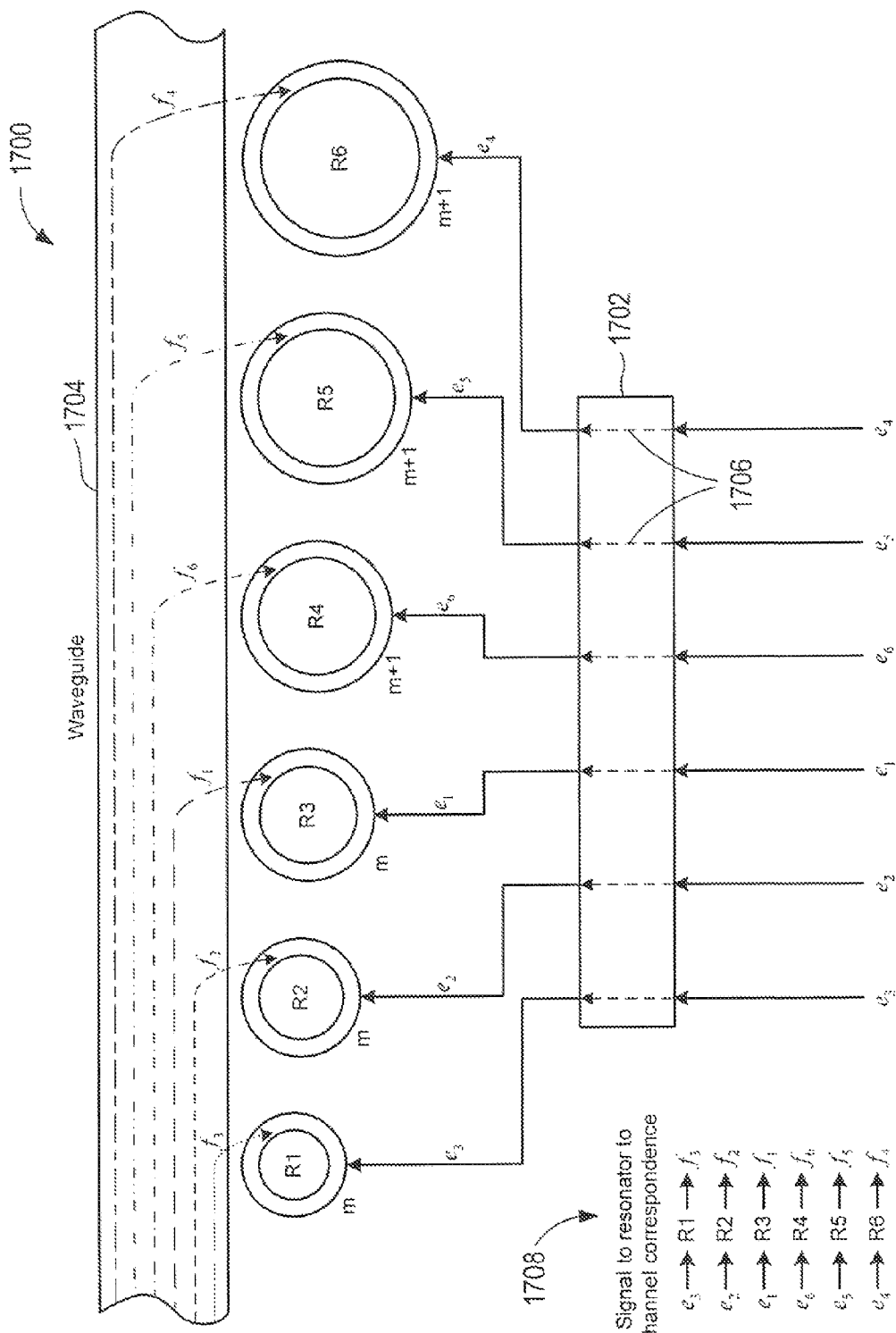
FIG. 17 shows an array of six resonators and a barrel shifter of an example tunable resonator system.

FIG. 17 shows an array of six resonators R1-R6 and a barrel shifter 1702 of an example tunable resonator system 1700. The system 1700 includes temperature sensors, a resonator control, and heating elements that are operated as described above for the systems 1200, 1210, and 1300, but these devices are not shown in FIG. 17 for the sake of clarity. The width of waveguide 1704 is shown enlarged in order to display a set of six different channels, denoted by $f_1$, $f_2$, $f_3$, $f_4$, $f_5$, and $f_6$, carried by the waveguide 1704, each channel represented by a different line pattern. FIG. 17 represents a correspondence between resonators, channels and electronic signals for a resonance temperature $T_{res}$ in which the resonators R1-R6 are operated to have resonance with the channels $f_1$, $f_2$, $f_3$, $f_4$, $f_5$, and $f_6$, respectively. The set of channels $f_1$, $f_2$, $f_3$, $f_4$, $f_5$, and $f_6$ are approximately equal spaced with a channel spacing expressed as $$\Delta f_j = f_{j+1} - f_j$$

where $f_j$ is a channel frequency and j=1, 2, 3, 4, 5, 6. Ideally, the channels satisfy the ratio, $$\frac{f_{i+1}}{f_i} = \frac{f_{i+2}}{f_{i+1}}$$

The channels $f_1$, $f_2$, $f_3$, $f_4$, $f_5$, and $f_6$ are called a "channel frequency comb." Each resonator R1-R6 has a resonance frequency that corresponds to one of the channels $f_1$, $f_2$, $f_3$, $f_4$, $f_5$, and $f_6$ of the channel frequency comb transmitted in the waveguide 1704. The set of resonance frequencies of the resonators R1-R6 have the same frequency spacing $\Delta f$ as the channels where half of the resonators R1, R2, and R3 are in mode m and the other resonators R4, R5, and R6 are in a higher mode m+1.

In general, the resonators are configured so that the channel with the highest frequency in the channel frequency comb is resonant with resonator having the smallest perimeter in the highest mode. For example, in FIG. 17, the resonator R4 has the smallest perimeter of the resonators R4, R5, and R6 in the mode m +1, and is resonant with the highest frequency $f_6$ in the channel frequency comb. On the other hand, the resonators are configured so that the channel with the lowest frequency in the channel frequency comb is resonant with the resonator having the largest perimeter in the lowest mode. For example, in FIG. 17, the resonator R3 has the largest perimeter of the resonators R1, R2, and R3 in the mode m and is resonant with the lowest frequency $f_1$ in the channel frequency comb. The resonance frequencies of the resonators R1-R6 are called a "resonator frequency comb." Methods are directed to adjusting the resonance frequencies of the resonators to match the frequencies of the channels in the channel frequency comb. The perimeter of the resonators can be determined by the expression:

$$p_{j+1} = \left(1 - \frac{n_g(f_j)}{n(f_j)} \frac{\Delta f_j}{f_j}\right) p_j$$

where $n_g(f_j)$ is the group refractive index, $n(f_j)$ is the resonator effective refractive index, and $p_j$ is the perimeter of the resonator $R_j$. A derivation of the expression for determining the perimeter of the resonators is provided below in an APPENDIX.

At the resonance temperature $T_{res}$, the barrel shifter 1702 is configured to receive a set of six electronic signals $e_1$, $e_2$, $e_3$, $e_4$, $e_5$, and $e_6$ that are sent to the resonators R1-R6 as indicated by dashed-line directional arrows 1706. The system 1700 can represent a modulator resonator system or a drop/add filter resonator system, as described above with reference to FIGS. 16A-16B. Thus, the electronic signals can be used to modulate the frequencies of the resonators R1-R6, as described above with reference to FIG. 16A, or the electronic signals can be used to operate the resonators R1-R6 as drop/add filters, as described above with reference to FIG. 16B. Alternatively, the directional arrows representing signal lines can be reversed and the system 1700 can represent a detector resonator system, as described above with reference to FIG. 16C. Table 1708 represents a correspondence between the electronic signals, the resonators, and the channels for the resonance temperature $T_{res}$.

Figure 18:
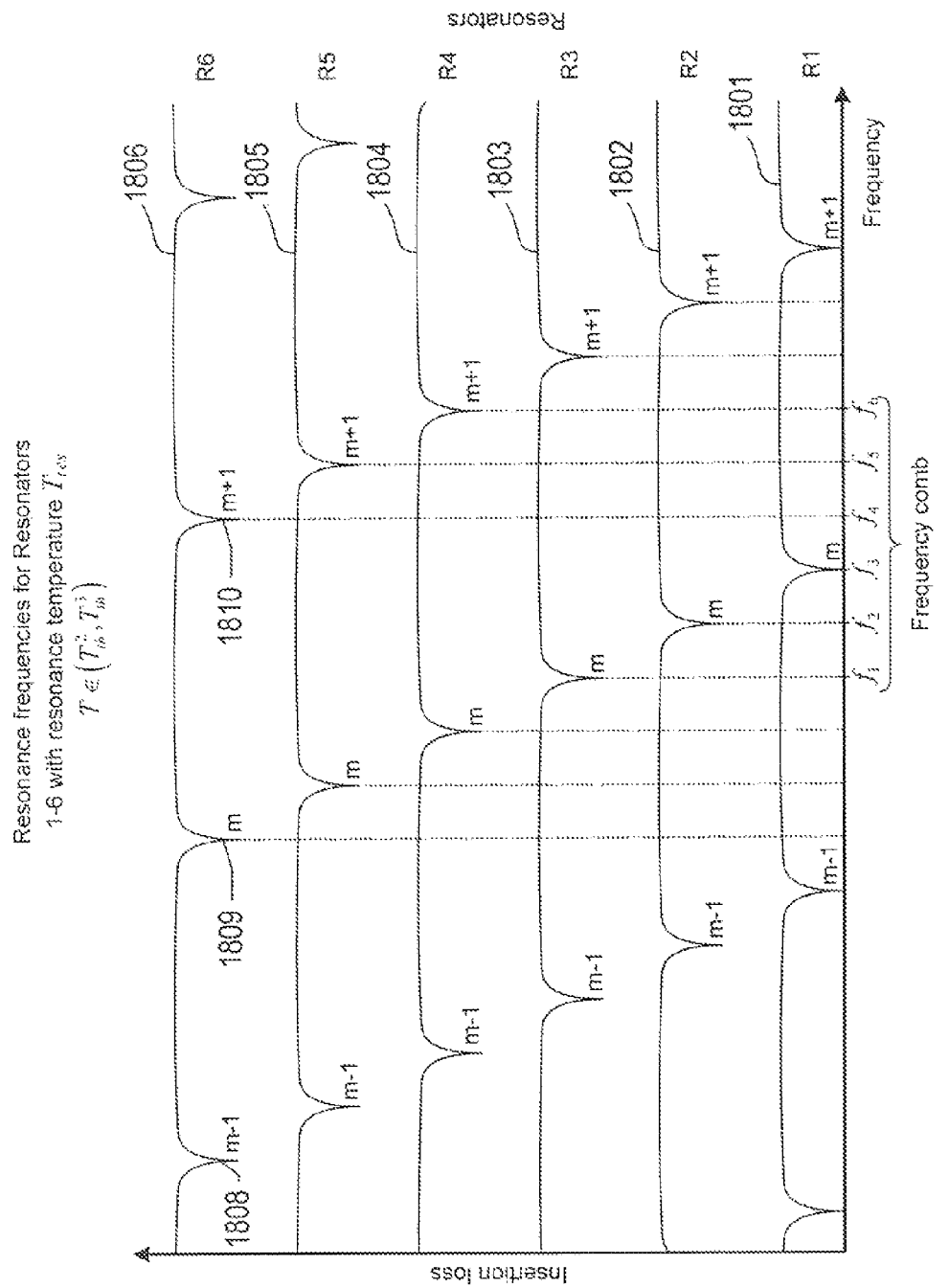
FIG. 18 shows an example plot of resonance frequencies of six resonators.

FIG. 18 shows an example plot of resonance frequencies associated with the resonators R1-R6 when the resonance temperature $T_{res}$ is maintained. Curves 1801-1806 represent insertion loss for the resonators R1-R6, respectively. The modes of each resonator are identified by the minima of the corresponding insertion loss curves. For example, minima 1808-1810 of the curve 1806 correspond to the modes m−1, m, and m+1 of the resonator R6. In the example of FIG. 18, at the resonance temperature $T_{res}$, the resonators R1-R6 have resonance frequencies where half of the resonators are in mode m and the other half are in mode m+1. In particular, the resonance frequencies of the resonators R3, R2, and R1 are in mode m and correspond to the channels $f_1$, $f_2$, and $f_3$, respectively, and the resonance frequencies of the resonators R6, R5, and R4 are in mode m+1 and correspond to the channels $f_4$, $f_5$, and $f_6$, respectively. FIG. 18 shows the resonance frequencies of the resonator frequency comb are aligned with the channels in the channel frequency comb.

Figure 19:
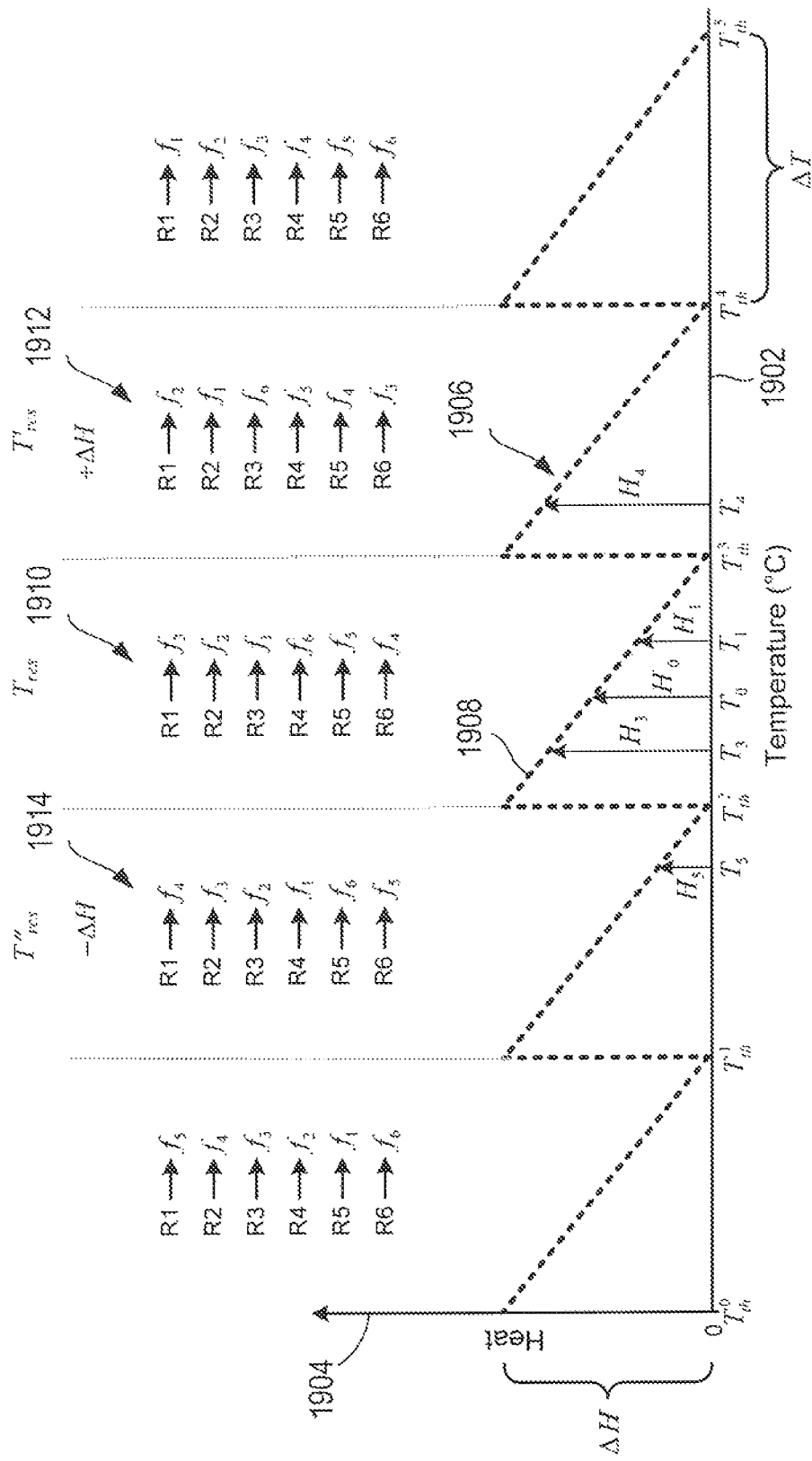
FIG. 19 shows an example plot of heat versus temperature.

FIG. 19 shows an example plot of heat versus temperature. Horizontal axis 1902 represents the temperature of the resonators R1-R6, and vertical axis 1904 represents heat, saw tooth-shaped, dashed-line curve 1906 represents the amount of heat used to maintain resonance frequencies. The amount of heat used to maintain a resonance temperature and ensure that the resonators R1-R6 are resonant with the frequency comb for a particular resonance temperature are approximated by linear negatively sloped portions of the curve 1906. For example, linear negatively sloped portion 1908 of the curve 1906 provides an approximate representation of the amount of heat used to maintain the resonance temperature $T_{res}$ and maintain the resonator-to-frequency correspondence 1910, for temperatures in the range $(T_{th}^2, T_{th}^3)$.

Figure 20:
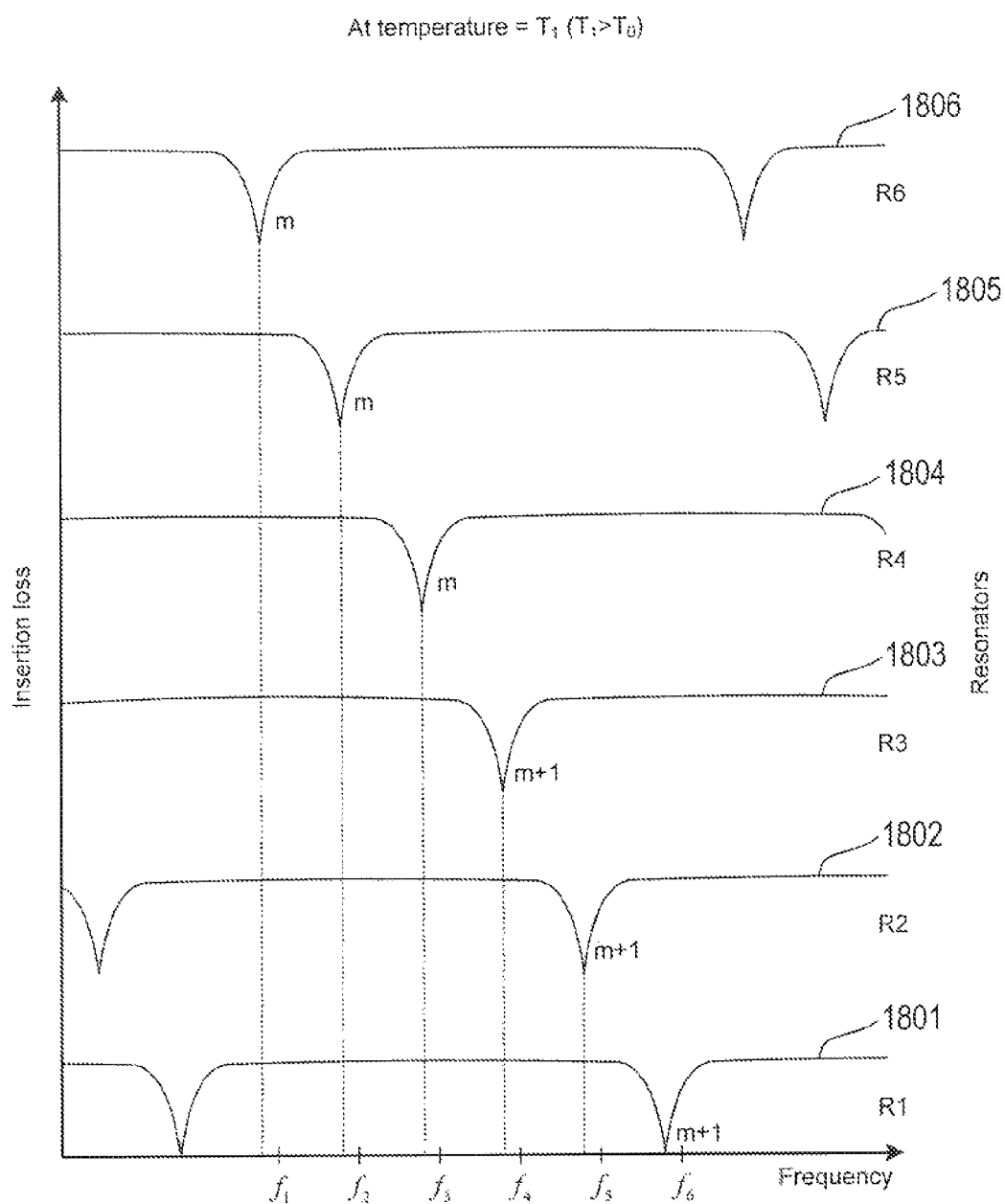
FIG. 20 show an example of a shift in resonance frequencies of six resonators as a result of an increase in temperature.

Suppose that initially the temperature of the resonators R1-R6 is $T_0$, which falls within the temperature range $(T_{th}^2, T_{th}^3)$. In order to maintain the resonance temperature $T_{res}$ and the resonator-to-resonance frequency correspondence 1910, the resonator control responds to measuring the temperature $T_0$ by applying an amount of heat $H_0$. Now suppose the temperature of the resonators R1-R6 increases to a temperature $T_1$. FIG. 20 shows an example of a shift in the resonance frequencies of the resonators R1-R6 as a result of the temperature change from $T_0$ to a higher temperature $T_1$. In the example of FIG. 20, the resonance frequencies of the resonators R1-R6 are shifted slightly to lower frequencies and are no longer aligned with the frequency comb. Returning to FIG. 19, the resonator control responds to measuring the temperature $T_1$ by lowering the amount of heat to $H_1$ to restore the resonance temperature $T_{res}$ and shift the resonance frequencies of the resonators R1-R6 into alignment with the frequency comb as shown in FIG. 18. Now suppose the temperature of the resonators R1-R6 decreases to a temperature $T_3$.

Figure 21:
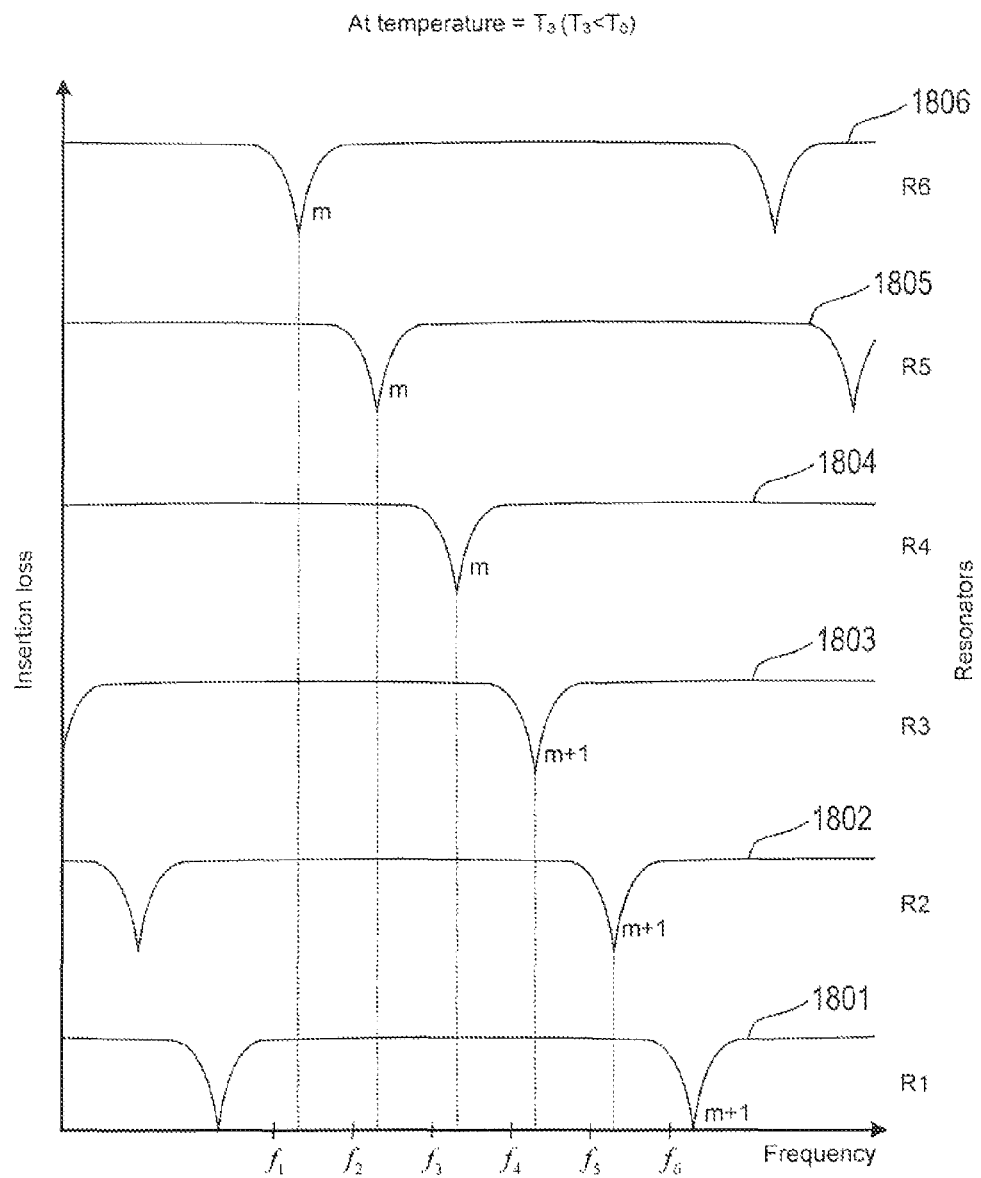
FIG. 21 show an example of a shift in resonance frequencies of six resonators as a result of a decrease in temperature.

FIG. 21 shows an example of a shift in the resonance frequencies of the resonators R1-R6 as a result of the temperature changing from $T_0$ to a lower temperature $T_1$. In the example of FIG. 21, the resonance frequencies of the resonators R1-R6 are shifted slightly to higher frequencies and are no longer aligned with the frequency comb. Returning to FIG. 19, the resonator control responds to measuring the temperature $T_3$ by increasing the amount of heat to $H_3$ to restore the resonance temperature $T_{res}$ and shift the resonance frequencies of the resonators R1-R6 into alignment with the frequency comb as shown in FIG. 18.

Note that in addition to applying heat to thermally tuning the resonators R1-R6, the resonator control may also electronically tune the resonators R1-R6 to further refine the resonator-to-resonance frequency correspondence.

Note that curve 1906 reveals that, as the temperature of the resonators R1-R6 approaches the threshold temperature $T_{th}^3$, the resonator control responds by applying less heat to the resonators to maintain the resonance temperature $T_{res}$ and the resonance-to-resonance frequency correspondence 1910. On the other hand, as the temperature of the resonators R1-R6 approaches the threshold $T_{th}^2$, the resonator control responds by applying more heat to the resonators R1-R6 to maintain the resonance temperature $T_{res}$ and resonance-to-resonance frequency correspondence 1910.

With reference to FIG. 19, now consider the case where the temperature of the resonators R1-R6 increases to $T_4$, which exceeds the threshold temperature $T_{th}^3$. As a result, the resonator-to-resonance frequency correspondence 1910 can no longer be maintained. Operation of the resonators R1-R6 as modulators, drop/add filters, or detectors is paused. Note that a pause in resonator operations can be delayed until associated hardware is idle or the pause is synchronized with multiple sets of resonator arrays to minimize system disruption. The resonator control applies the amount of heat $H_4$ to achieve a resonance temperature $T'_{res}$, resulting in a circular resonator to resonance frequency shift represented by resonator-to-resonance frequency correspondence 1912. In other words, the resonance frequencies in the resonator frequency comb do not change. The resonance frequencies of the resonators R1-R6 are circularly shifted by the frequency spacing $\Delta f$ so that resonator frequencies of the resonance frequency comb do not change but the resonance frequency comb has a different alignment with the frequencies in the channel frequency comb as follows.

Figure 22:
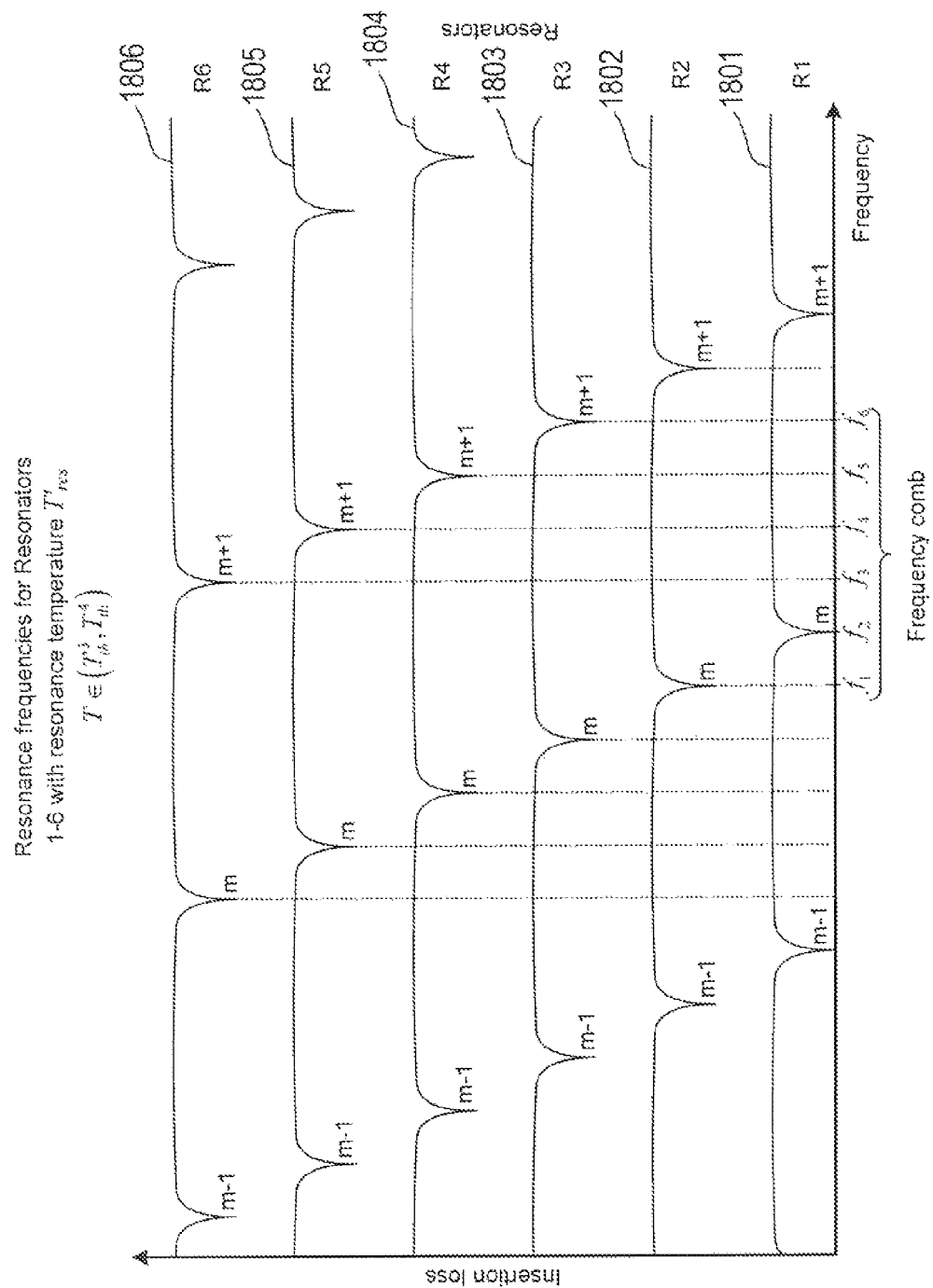
FIG. 22 shows an example plot of resonance frequencies of six resonators.

FIG. 22 shows an example plot of resonance frequencies associated with the resonators R1-R6 for resonance temperature $T'_{res}$. As shown in the example of FIG. 22, the resonance frequencies associated with the modes of the resonators R2-R6 are shifted by frequency spacing $-\Delta f$. When the resonance temperature is changed from $T_{res}$ to $T'_{res}$, the modes of the resonators R1, R2, R4, R5, and R6 do not change. For example, with reference to FIG. 18, at the resonance temperature $T_{res}$, the mode m resonance frequency for the resonator R2 is $f_2$. Returning to FIG. 22, when the resonance temperature is $T'_{res}$, the mode m resonance frequency for the resonator R2 is $f_1$ (i.e., $f_1 \approx f_2 - \Delta f$). But the mode and resonance frequency for the resonator R3 changes. For example, with reference to FIG. 18, at the resonance temperature $T_{res}$, the resonator R3 is the mode m with resonance frequency $f_1$. Returning to FIG. 22, when the resonance temperature is $T'_{res}$, the resonator R3 is switched to mode m+1 with a resonance frequency $f_6$.

Note that even though the resonance frequencies of the resonators have changed (i.e., circularly shifted), the resonator frequency comb of the resonators R1-R6 is maintained and matches the resonance frequencies in the channel frequency comb at resonance temperature $T'_{res}$ but the resonator-to-frequency correspondence between the combs is changed to accommodate changes in the ambient temperature.

In addition to applying heat to change the resonance temperature and thermally tuning the resonators R1-R6, the resonator control may also electronically tune the resonators R1-R6 to further refine the resonator-to-resonance frequency correspondence.

Figure 23:
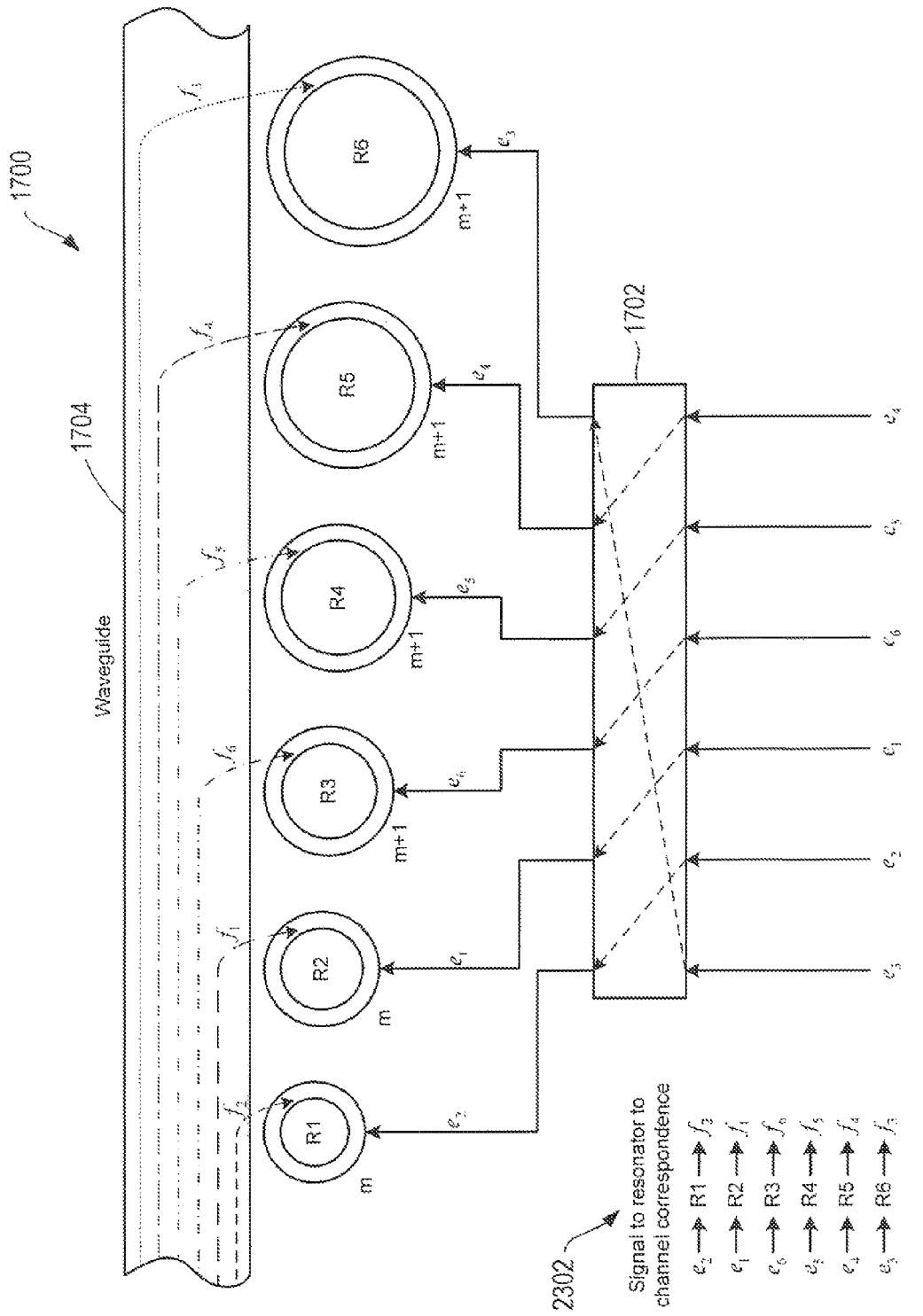
FIG. 23 shows a barrel shifter reconfigured to account for an increase in temperature.

At the resonance temperature $T'_{res}$, the barrel shifter 1702 re-routes the electronic signals to match changes in the resonator-to-frequency correspondence, as shown in FIG. 23. Table 2302 shows the electronic signal to resonator to channel correspondence. Note that the electronic signal to channel correspondence is unchanged from that shown in Table 1708 of FIG. 17. For example, when the resonance temperature was $T_{res}$, as described above with reference to FIG. 17, the electronic signal $e_1$ was sent by the barrel shifter 1702 to resonator R3, with a mode m resonance frequency that matched the channel $f_1$. However, returning to FIG. 23, because the resonance temperature is $T'_{res}$, the electronic signal to resonator correspondence is circularly shifted so that the signal $e_1$ is sent to the resonator R2, which is resonant with the frequency $f_1$.

After the resonance frequencies of the resonators have been shifted and the barrel shifter reconfigured to match the shift in resonator resonance frequencies, operation of the resonators R1-R6 as modulators, drop/add filters, or detectors is resumed.

Returning to FIG. 19, now consider the case where the temperature of the resonators R1-R6 decreases to $T_5$, which is less than the threshold temperature $T_{th}^2$. As a result, the resonator-to-frequency correspondence 1910 can no longer be maintained. Operation of the resonators R1-R6 is paused. The resonator control applies an amount of heat $H_5$ to achieve a resonance temperature $T''_{res}$, resulting in a circular resonator to resonance frequency shift represented by resonator-to-frequency correspondence 1914.

Figure 24:
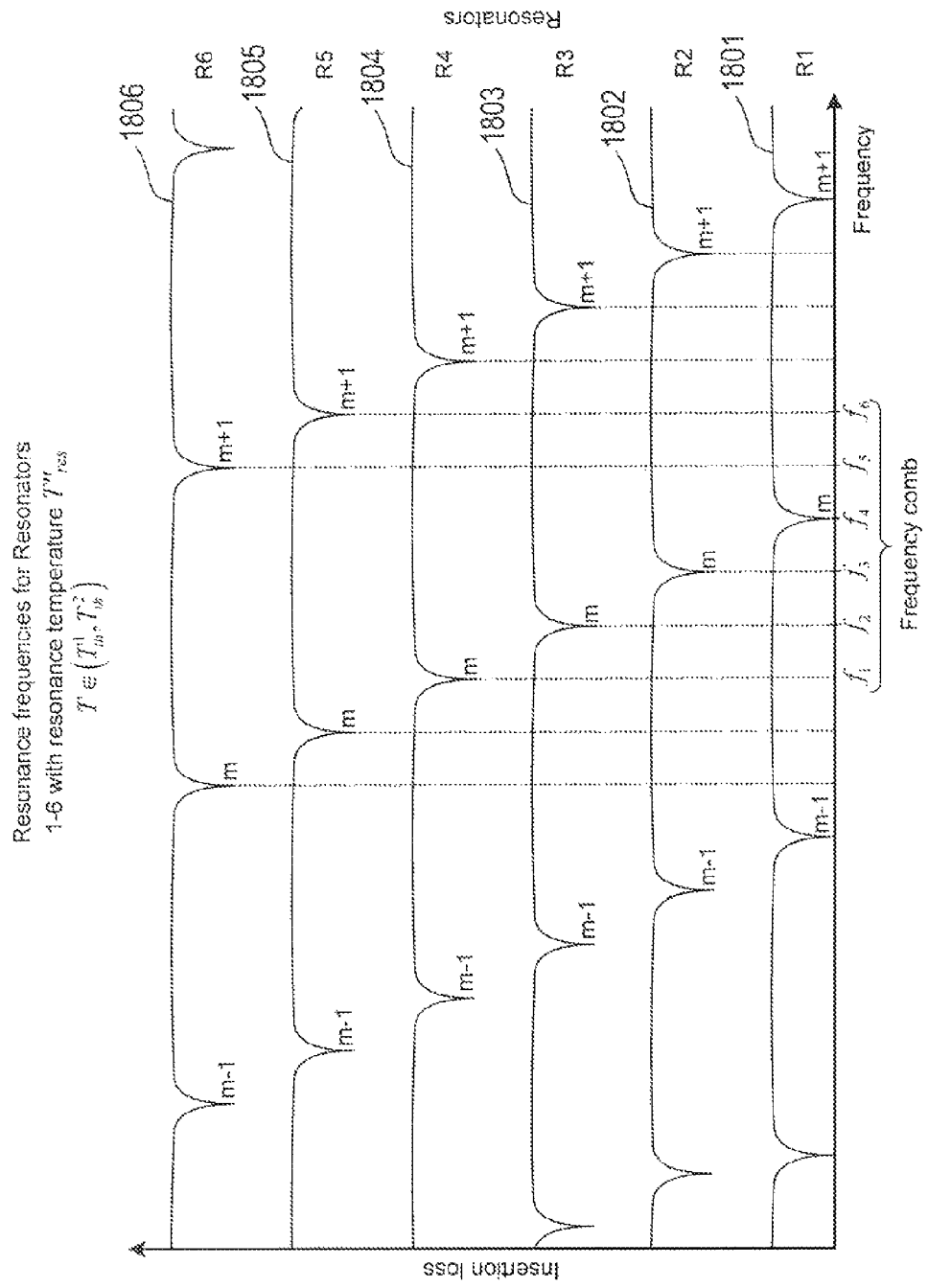
FIG. 24 shows an example plot of resonance frequencies of six resonators.

FIG. 24 shows an example plot of resonance frequencies associated with the resonators R1-R6 for resonance temperature $T''_{res}$. As shown in the example of FIG. 24, the resonance frequencies associated with the modes of the resonators R1-R5 are shifted by frequency spacing $\Delta f$. When the resonance temperature is changed from $T_{res}$ to $T''_{res}$, the modes of the resonators R1, R2, R3, R5, and R6 do not change. For example, with reference to FIG. 18, at the resonance temperature $T_{res}$, the resonator R5 resonance frequency at the mode m+1 is $f_5$. Returning to FIG. 24, when the resonance temperature is $T''_{res}$, the resonator R5 resonance frequency at the mode m+1 is $f_6$ (i.e., $f_6 \approx f_5 + \Delta f$). But the mode and resonance frequency for the resonator R4 changes. For example, with reference to FIG. 18, at the resonance temperature $T_{res}$, the resonator R4 is the mode m+1 with resonance frequency $f_6$. Returning to FIG. 22, when the resonance temperature is $T''_{res}$, the resonator R4 is switched to mode m with a resonance frequency $f_1$.

Note that even though the resonance frequencies of the resonators have changed (i.e., circularly shifted), the resonator frequency comb of the resonators R1-R6 is maintained and matches the resonance frequencies in the channel frequency comb at resonance temperature $T''_{res}$ but the resonator-to-frequency correspondence between the combs is changed to accommodate changes in the ambient temperature.

In addition to applying heat to change the resonance temperature and thermally tuning the resonators R1-R6, the resonator control may also electronically tune the resonators R1-R6 to further refine the resonator-to-resonance frequency correspondence.

Figure 25:
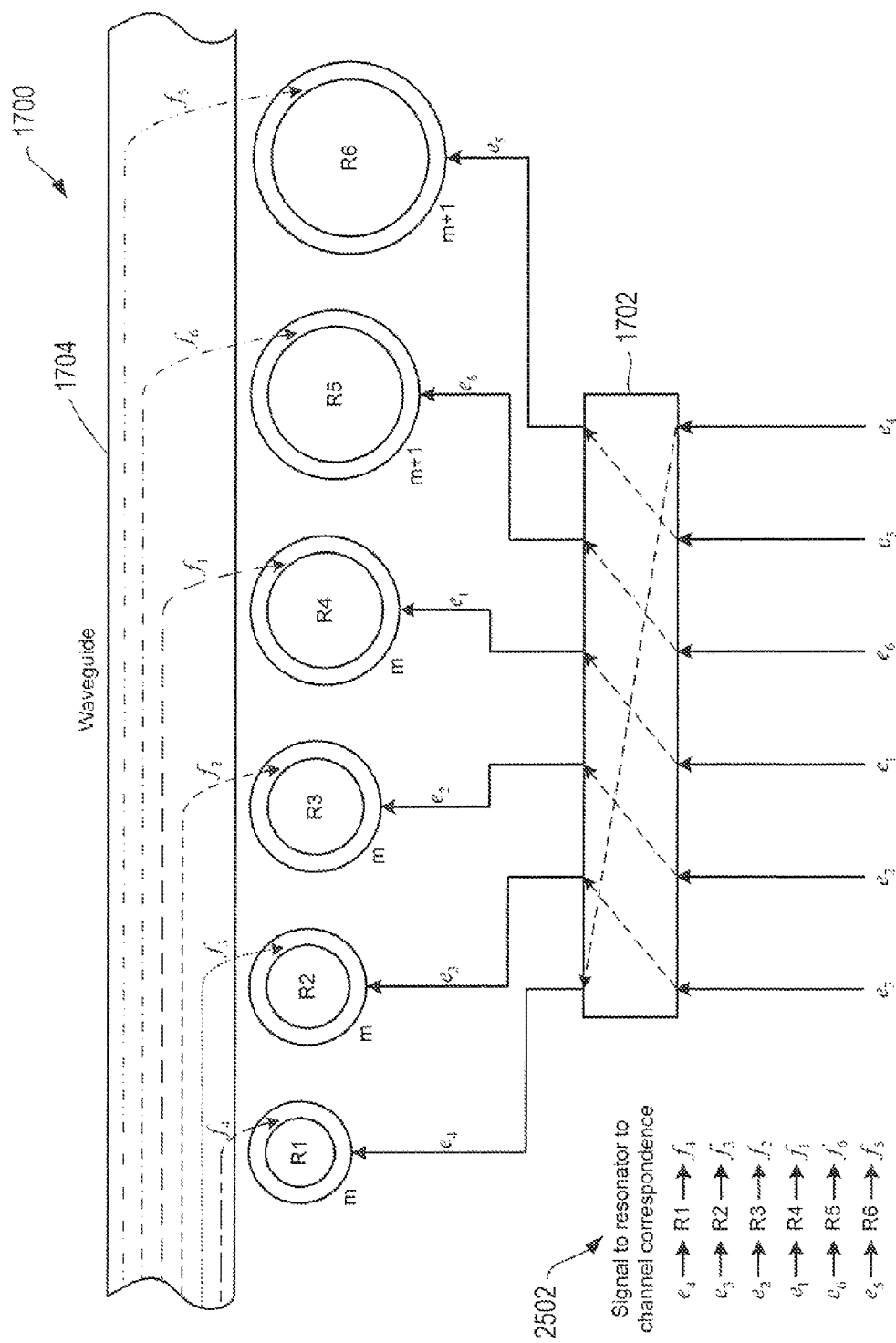
FIG. 25 shows the barrel shifter reconfigured to account for a decrease in temperature.

At the resonance temperature $T''_{res}$, the barrel shifter 1702 re-routes electronic signals to maintain the electronic signal to channel correspondence. FIG. 25 shows the barrel shifter 1702 reconfigured to account for the temperature change to $T''_{res}$. Table 2502 shows the electronic signal to resonator to channel correspondence. The electronic signal to channel correspondence is unchanged from that shown in Table 1708 of FIG. 17.

Figure 26:
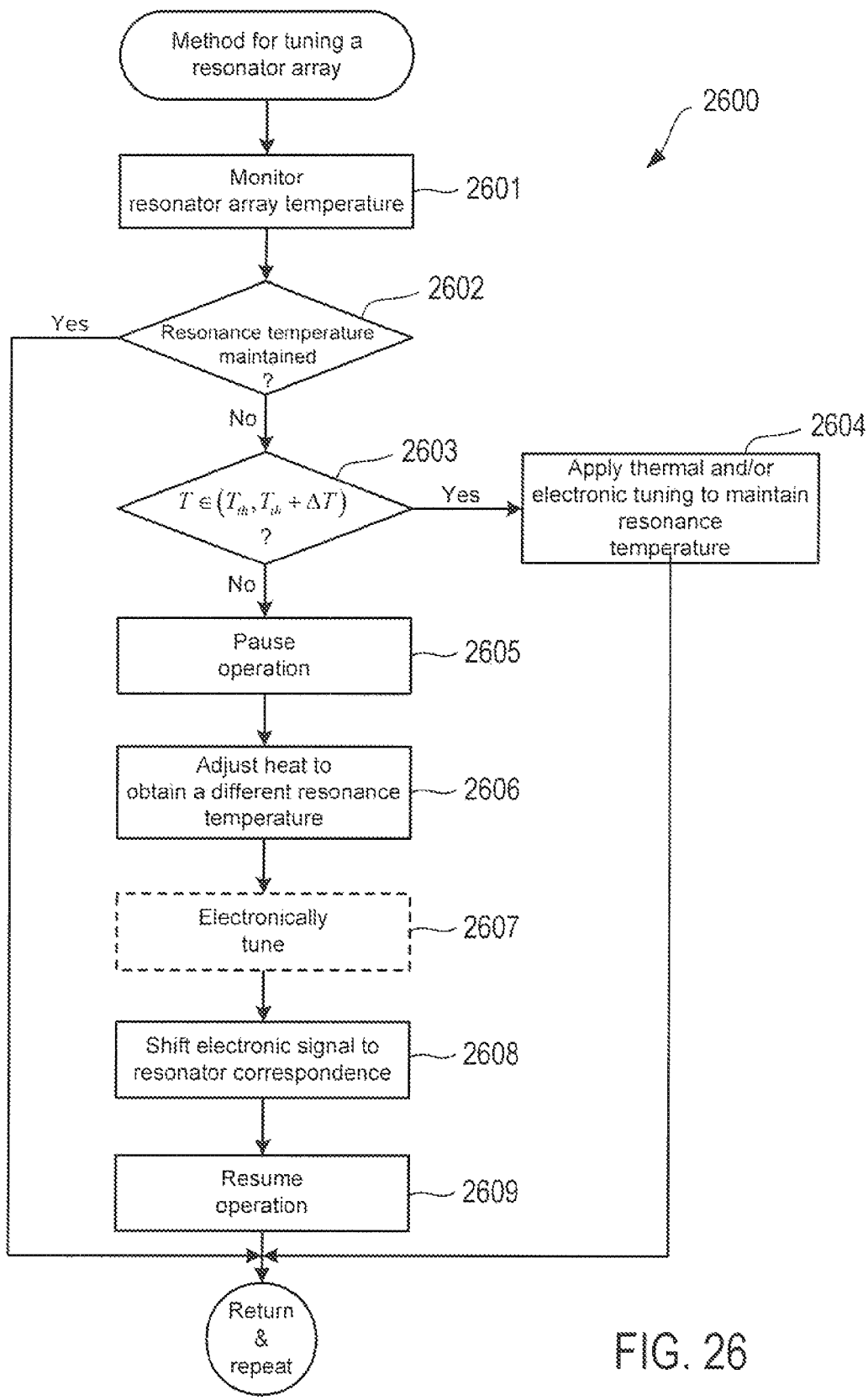
FIG. 26 shows a control-flow diagram that summarizes methods for tuning an array of resonators.

FIG. 26 shows a control-flow diagram 2600 that summarizes methods based on resonance temperatures for tuning an array of resonators. In stage 1601, the temperature of an array of resonators is monitored using temperature sensors, as described above with reference to FIGS. 6-8 and 12-13. In stage 1602, when the resonance temperature changes, the method proceeds to stage 2603, otherwise the method 2600 is repeated. In stage 1603, when the temperature of the array of resonators is within a tunable temperature range $(T_{th}, T_{th}+\Delta T)$, the method proceeds to stage 2604, otherwise the method proceeds to stage 2605. In stage 2604, the resonator control applied electronic and/or thermal tuning to tune the array of resonators to maintain the resonator-to-resonance frequency correspondence, as described above with reference to FIGS. 19-21. In stage 2605, operation of the array of resonators is paused. In stage 2606, the resonator control applies heat so that the temperature of the array of resonators approximately matches a different resonance temperature and a different resonator-to-resonance frequency correspondence is formed, as described above with reference to FIGS. 19, 22-25. In stage 2607, as an alternative to, or in conjunction with, stage 2606, the resonator control may electronically tune the array of resonators to form a different resonator-to-resonance frequency correspondence. In stage 2608, the resonator control shifts the electronic signal to resonator correspondence, as described above with reference to FIGS. 23 and 25. In stage 2609, operation of the array of resonators resumes.

APPENDIX

This appendix provides a derivation of a mapping between channels in a channel frequency comb to the perimeter dimensions for the resonators. Consider first the a channel frequency comb with N channels generated by a Fabry-Perot laser, the frequency of each channel is denoted by $f_j$, where $j \in \{1, \ldots, N\}$ and the channel spacing is expressed by $$\Delta f_j = f_{j+1} - f_j$$

which is an integer multiple of the modulator frequency $f_0$. The Fabry-Perot laser produces channels with a frequency expressed by:

$$f_j = \frac{(j+N_0)c}{2\tilde{n}(f_j)L}$$

where $N_0$ is a natural number, c is the free space speed of light, $\tilde{n}(f_j)$ is the effective refractive index, and L is the laser cavity length. As a result, $$\frac{\delta f_j}{f_j} = \frac{\tilde{n}(f_j)}{\tilde{n}_g(f_j)} \frac{\delta j}{N_0 + 1}$$

at constant temperature and constant current, where $\tilde{n}_g(f_j)$ is the group refractive index. Thus, channel spacing can be expressed as $$\Delta f_j \equiv f_{j+1} - f_j = \frac{c}{2\tilde{n}_g(f_j)L}$$

The channel spacing $\Delta f_i$ may change slightly as the effective group refractive index changes from $f_1$ to $f_N$.

On the other hand, for N resonators, the mode m is fixed, the perimeter p of the resonator is allowed to vary so that resonance frequencies of N resonators match the N channels in the channel frequency comb. The resonance frequency of a resonantor can be expressed by $$f_j = \frac{mc}{n(f_j)p_j}$$

where m is a natural number, and n is the effective refractive index of the resonator.

In practice, the resonator frequency $f_j$ matches the channel frequency $f_j$ for some mode m, and the free spectral range $\Delta f_{FSR}(\text{ring } j) = (N+1)\Delta \bar{f}$, where $\Delta \bar{f}$ is the average channel spacing. As a result, the relationship between the perimeter and the channel frequency can be expressed as follows:

$$\Delta f_j = -f_j \frac{n(f_j)}{n_g(f_j)} \frac{p_{j+1} - p_j}{p_j}, \text{ or}$$

$$p_j - p_{j+1} = \frac{n_g(f_j)}{n(f_j)} \frac{\Delta f_j}{f_j} p_j$$

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific embodiments are presented for purposes of illustration and description. They are not intended to be exhaustive of or to limit this disclosure to the precise forms described. Obviously, many modifications and variations are possible in view of the above teachings. The embodiments are shown and described in order to best explain the principles of this disclosure and practical applications, to thereby enable others skilled in the art to best utilize this disclosure and various embodiments with various modifications as are suited to the particular use contemplated. It is intended that the scope of this disclosure be defined by the following claims and their equivalents:

The invention claimed is:

1. A resonator system comprising:
an array of resonators disposed adjacent to a waveguide, wherein each resonator has a resonance frequency in a resonator frequency comb, and wherein channels with frequencies in a channel frequency comb are transmitted in the waveguide;
at least one temperature sensor located adjacent to the array of resonators;
a resonator control electronically connected to the at least one temperature sensor, wherein resonance frequencies in the resonator frequency comb are to be adjusted by the resonator control in response to ambient temperature changes detected by the at least one temperature sensor to align the resonance frequency comb with the channel frequency comb; and
a barrel shifter connected to each resonator in the array of resonators, wherein the barrel shifter maintains an electronic signal-to-resonance frequency correspondence as directed by the resonator control in response to an ambient temperature change detected by the at least one temperature sensor.

2. The system of claim 1, wherein each resonator has a resonance frequency in the resonator frequency comb further comprises the resonators having approximately the same frequency spacing as the channels in the channel frequency comb.

3. The system of claim 1 further comprising at least one heating element disposed adjacent to the array of resonators and electronically connected to the resonator control, wherein the resonator control heats the at least one heating element in response to a change in the ambient temperature in order to align the resonance frequency comb with the channel frequency comb.

4. The system of claim 3, wherein the at least one heating element further comprises a single resistive region surrounding a portion of each resonator.

5. The system of claim 3, wherein each heating element of the at least one heating element further comprises a resistive region surrounding a portion of the array of resonators.

6. The system of claim 1, wherein resonance frequencies in the resonator frequency comb are to be adjusted in response to ambient temperature changes further comprises the resonator control injects current into the resonators to align the resonance frequency comb with the channel frequency comb.

7. The system of claim 1, wherein the array of resonators comprises resonators to operate in a plurality of modes, a resonator having a smallest perimeter among the resonators to operate in a highest frequency mode to be resonant with a channel having a highest frequency in the channel frequency comb.

8. The system of claim 1, wherein the array of resonators comprises resonators to operate in a plurality of modes, a resonator having a largest perimeter among the resonators to operate in a lowest frequency mode to be resonant with a channel having a lowest frequency in the channel frequency comb.

9. The system of claim 1, wherein align the resonance frequency comb with the channel frequency comb further comprises a circular shift in a resonator-to-resonance frequency correspondence.

10. A method for tuning an array of resonators comprising:
monitoring the temperature of the array of resonators with at least one temperature sensor, the array of resonators disposed adjacent to a waveguide, wherein each resonator has a resonance frequency in a resonator frequency comb, and wherein channels in a channel frequency comb are transmitted in the waveguide, the array of resonators having a tuning temperature range;
tuning the array of resonators to maintain a resonator frequency comb alignment with the channel frequency comb when the temperature is within the tuning temperature range, and tuning the array of resonators to establish a different resonator frequency comb alignment with the channel frequency comb when the temperature is not within the tuning temperature range; and
shifting electronic signal-to-resonator correspondence to maintain an electronic signal-to-resonance frequency correspondence.

11. The method of claim 10 further comprising pausing operation of the array of resonators when the temperature is not within the tuning temperature range.

12. The method of claim 11 further comprising resuming operation of the array of resonators when tuning the array of resonators and shifting the electronic signal-to-resonator correspondence is complete.

13. The method of claim 10, wherein tuning the array of resonators to maintain the resonator frequency comb alignment with the channel frequency comb further comprises injecting current to electronically tune the array of resonators.

14. The method of claim 10, wherein tuning the array of resonators to maintain the resonator frequency comb alignment with the channel frequency comb further comprises applying heat using at least one heating element to thermally tune the array of resonators.

15. The method of claim 10, wherein tuning the array of resonators to establish the different resonator frequency comb alignment with the channel frequency comb when the temperature is not within the tuning temperature range further comprises injecting current to the resonators to change a resonator-to-resonance frequency correspondence with the channel frequency comb.

16. The method of claim 10, wherein tuning the array of resonators to establish the different resonator frequency comb alignment with the channel frequency comb when the temperature is not within the tuning temperature range further comprises applying heat to the resonators using at least one heating element to change a resonator-to-resonance frequency correspondence with the channel frequency comb.

17. The method of claim 10, wherein tuning the array of resonators to establish a different resonator frequency comb alignment with the channel frequency comb further comprises shifting a first resonator-to-resonance frequency correspondence with resonance frequencies in the resonator frequency comb to a second resonator-to-resonance frequency correspondence with resonance frequencies in the resonator frequency comb.

18. The method of claim 10, wherein tuning the array of resonators to establish a different resonator frequency comb alignment with the channel frequency comb further comprises shifting a first resonator-to-resonance frequency correspondence to a second resonator-to-resonance frequency correspondence wherein the resonance frequency of each resonator shifts to a resonance frequency mode of an adjacent resonator.

19. The method of claim 10, wherein tuning the array of resonators to establish a different resonator frequency comb alignment with the channel frequency comb further comprises circularly shifting a first resonator-to-resonance frequency correspondence to a second resonator-to-resonance frequency correspondence.

* * * * *